US012563636B2

(12) United States Patent
Back et al.

(10) Patent No.: US 12,563,636 B2
(45) Date of Patent: Feb. 24, 2026

(54) METHOD AND APPARATUS FOR OPERATING UE RELATED TO TRANSMISSION OF DATA WITH DIFFERENT SL DRX CONFIGURATIONS IN WIRELESS COMMUNICATION SYSTEM

(71) Applicant: LG Electronics Inc., Seoul (KR)

(72) Inventors: Seoyoung Back, Seoul (KR); Seungmin Lee, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 349 days.

(21) Appl. No.: 18/311,601

(22) Filed: May 3, 2023

(65) Prior Publication Data

US 2023/0363047 A1 Nov. 9, 2023

(30) Foreign Application Priority Data

May 3, 2022 (KR) ........................ 10-2022-0054977

(51) Int. Cl.
*H04W 76/28* (2018.01)
(52) U.S. Cl.
CPC .................................. *H04W 76/28* (2018.02)
(58) Field of Classification Search
None
See application file for complete search history.

(56) References Cited

U.S. PATENT DOCUMENTS

| | | | | |
|---|---|---|---|---|
| 2017/0285105 A1* | 10/2017 | Uemura | ................ | H04W 72/23 |
| 2019/0313359 A1* | 10/2019 | Lee | .......... | H04W 4/40 |
| 2021/0045178 A1* | 2/2021 | Kung | .................... | H04W 76/18 |
| 2021/0153065 A1* | 5/2021 | Adjakple | .............. | H01M 4/134 |
| 2021/0219299 A1* | 7/2021 | Peng | ........................ | H04W 4/40 |
| 2022/0061020 A1* | 2/2022 | Wang | .................. | H04W 68/005 |
| 2023/0007730 A1* | 1/2023 | Zeng | .................... | H04W 76/28 |
| 2023/0072047 A1* | 3/2023 | Beale | ................ | H04W 52/0229 |
| 2023/0171378 A1* | 6/2023 | Lin | ........................ | H04N 7/142 348/14.12 |
| 2023/0171738 A1* | 6/2023 | Di Girolamo | ........ | H04W 72/02 370/329 |
| 2023/0284136 A1* | 9/2023 | Ganesan | .............. | H04W 76/28 370/311 |
| 2024/0008000 A1* | 1/2024 | Li | ..................... | H04W 28/0278 |
| 2024/0015840 A1* | 1/2024 | Li | ......................... | H04W 72/40 |

* cited by examiner

*Primary Examiner* — Jamaal Henson
(74) *Attorney, Agent, or Firm* — Fish & Richardson P.C.

(57) ABSTRACT

A transmission method related to a groupcast of a user equipment (UE) in a wireless communication system includes selecting a destination having a logical channel (LCH) with a highest priority among available sidelink data for transmission, generating a Medium Access Control Protocol Data Unit (MAC PDU) from data related to the destination, and transmitting the MAC PDU at an active time, wherein the data related to the destination is data related to the active time among a plurality of data related to the destination, and the UE determines the data related to the active time among the plurality of data related to the destination based on a service ID.

8 Claims, 21 Drawing Sheets

METHOD AND APPARATUS FOR OPERATING UE RELATED TO TRANSMISSION OF DATA WITH DIFFERENT SL DRX CONFIGURATIONS IN WIRELESS COMMUNICATION SYSTEM

CROSS-REFERENCE TO RELATED APPLICATIONS

This application claims the benefit of Korean Patent Application No. 10-2022-0054977, filed on May 3, 2022, which is hereby incorporated by reference as if fully set forth herein.

TECHNICAL FIELD

The following description relates to a wireless communication system, and more particularly, to a method and apparatus for operating a user equipment (UE) related to a manner of performing and transmitting logical channel prioritization (LCP) of data having different Sidelink Discontinuous Reception (SL DRX) configurations.

BACKGROUND

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms.

This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

SUMMARY

An object of the present disclosure is to provide operations related to a manner of performing and transmitting a logical channel prioritization (LCP) procedure of data having the same Destination Layer-2 ID (DST L2 ID) but different SL DRX configurations.

According to an embodiment, a transmission method related to a groupcast of a user equipment (UE) in a wireless communication system includes selecting a destination having a logical channel (LCH) with a highest priority among available sidelink data for transmission, generating a Medium Access Control Protocol Data Unit (MAC PDU) from data related to the destination, and transmitting the MAC PDU at an active time, wherein the data related to the destination is data related to the active time among a plurality of data related to the destination, and the UE determines the data related to the active time among the plurality of data related to the destination based on a service ID.

A user equipment (UE) in a wireless communication system includes at least one processor, and at least one computer memory operatively connected to the at least one processor and configured to store instructions that, when executed, cause the at least one processor to perform operations, wherein the operations include selecting a destination having a logical channel (LCH) with a highest priority among available sidelink data for transmission, generating a Medium Access Control Protocol Data Unit (MAC PDU) from data related to the destination, and transmitting the MAC PDU at an active time, and the data related to the destination is data related to the active time among a plurality of data related to the destination, and the UE determines the data related to the active time among the plurality of data related to the destination based on a service ID.

Provided is a non-volatile computer readable storage medium storing at least one computer program including an instruction that, when executed by at least one processor, cause the at least one processor to perform operations for a user equipment (UE), the operations including selecting a destination having a logical channel (LCH) with a highest priority among available sidelink data for transmission, generating a Medium Access Control Protocol Data Unit (MAC PDU) from data related to the destination, and transmitting the MAC PDU at an active time, wherein the data related to the destination is data related to the active time among a plurality of data related to the destination, and the UE determines the data related to the active time among the plurality of data related to the destination based on a service ID.

The service ID may be transferred to an Access Stratum (AS) layer from a higher layer of the UE.

The plurality of data related to the destination may be related to the same Destination Layer-2 ID (DST L2 ID).

One TX profile may be related to the service ID.

The TX profile may include configurations related to sidelink Discontinuous Reception (DRX).

A configuration related to the sidelink DRX may include information on the active time.

The data related to the destination may be multiplexed for generating the MAC PDU.

The UE may report only information on a DRX-based TX profile to a base station (BS).

The UE may receive resource information that is allocated by the BS based on the information on the DRX-based TX profile.

The UE may communicate with at least one of another UE, a UE related to an autonomous driving vehicle, a base station (BS), or a network.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 10 illustrates a synchronization source or synchronization reference of V2X according to an embodiment of the present disclosure;

DETAILED DESCRIPTION

In various embodiments of the present disclosure, "I" and "," should be interpreted as "and/or". For example, "A/B" may mean "A and/or B". Further, "A, B" may mean "A and/or B". Further, "AB/C" may mean "at least one of A, B and/or C". Further, "A, B, C" may mean "at least one of A, B and/or C".

In various embodiments of the present disclosure, "or" should be interpreted as "and/or". For example, "A or B"

may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
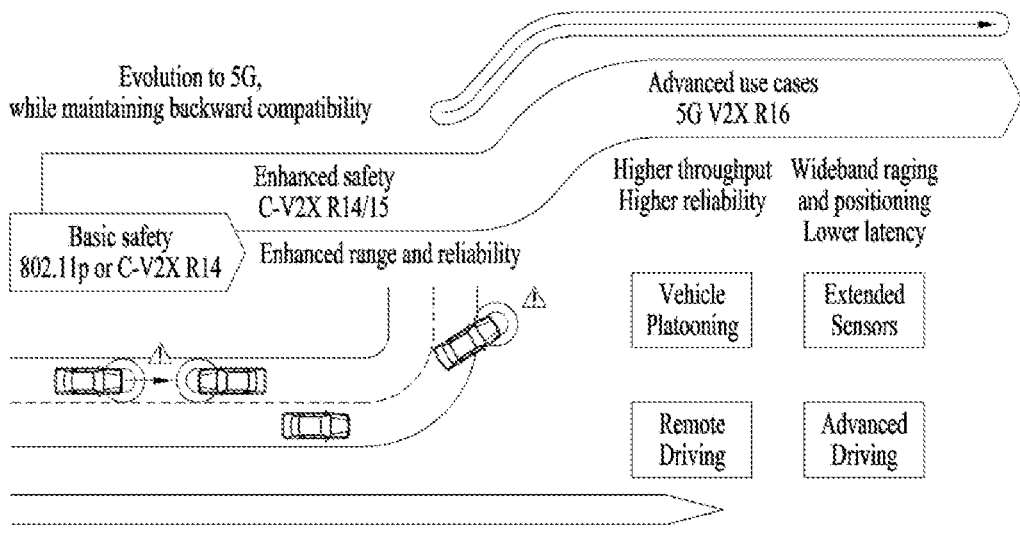
FIG. 1 is a diagram for explaining comparison between vehicle-to-everything (V2X) communication based on pre-new radio (NR) radio access technology (RAT) and V2X communication based on NR.
Figure 2:
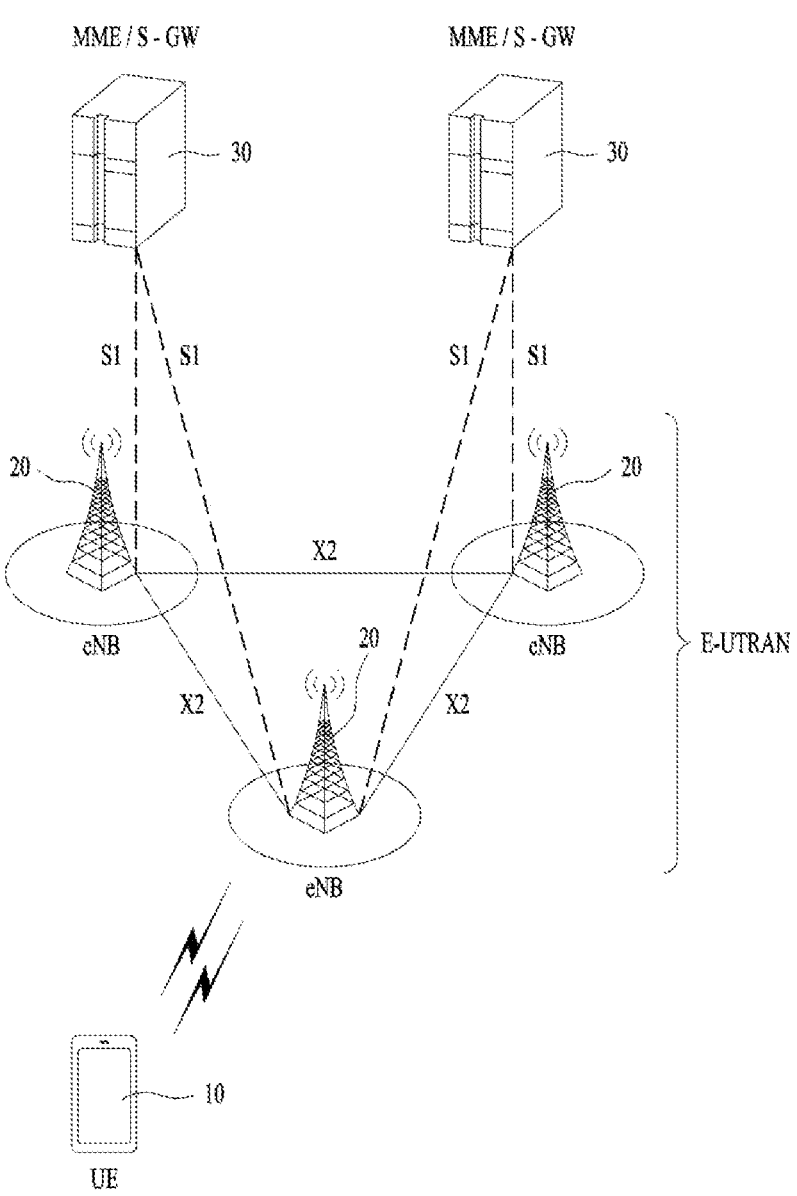
FIG. 2 illustrates the structure of a Long Term Evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2)

and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3B:
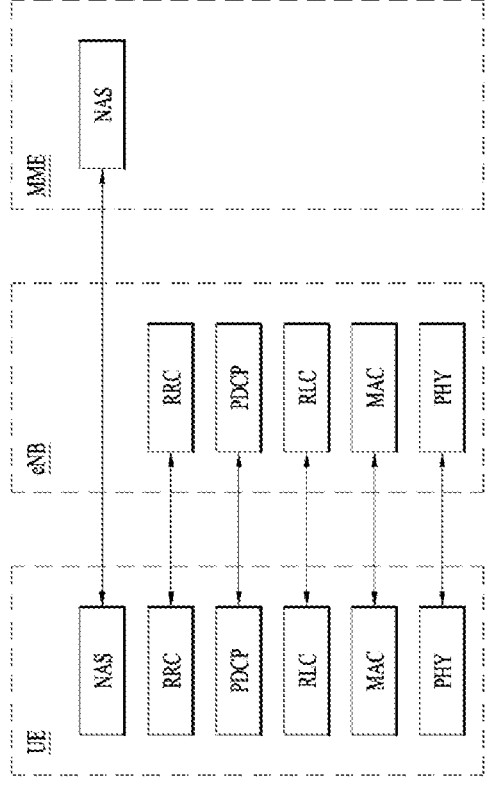
FIGS. 3A and 3B illustrate radio protocol architectures for user and control planes according to an embodiment of the present disclosure.
Figure 3A:
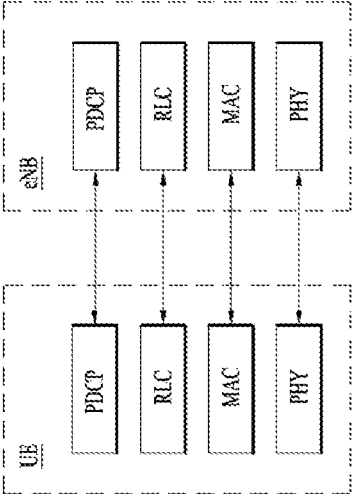

FIG. 3A illustrates a user-plane radio protocol architecture according to an embodiment of the disclosure.

FIG. 3B illustrates a control-plane radio protocol architecture according to an embodiment of the disclosure. A user plane is a protocol stack for user data transmission, and a control plane is a protocol stack for control signal transmission.

Referring to FIGS. 3A and 3B, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RB s. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
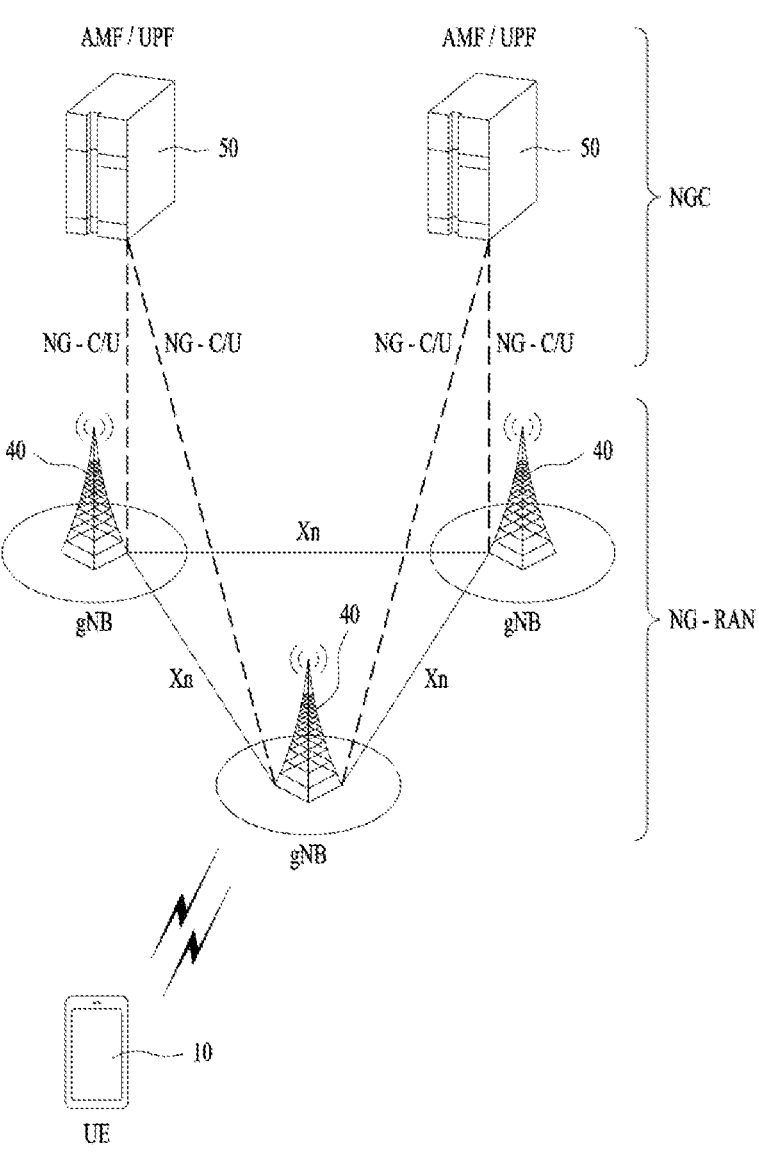
FIG. 4 illustrates the structure of a new radio (NR) system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
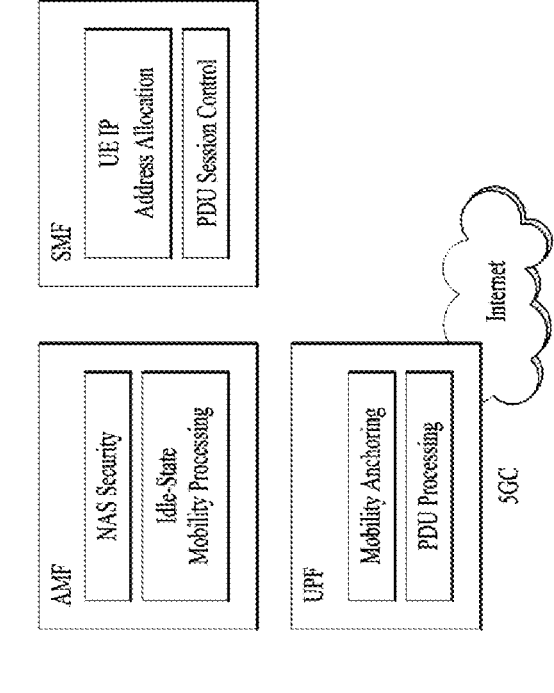
FIG. 5 illustrates a functional division between a next generation radio access network (NG-RAN) and a fifth-generation core (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
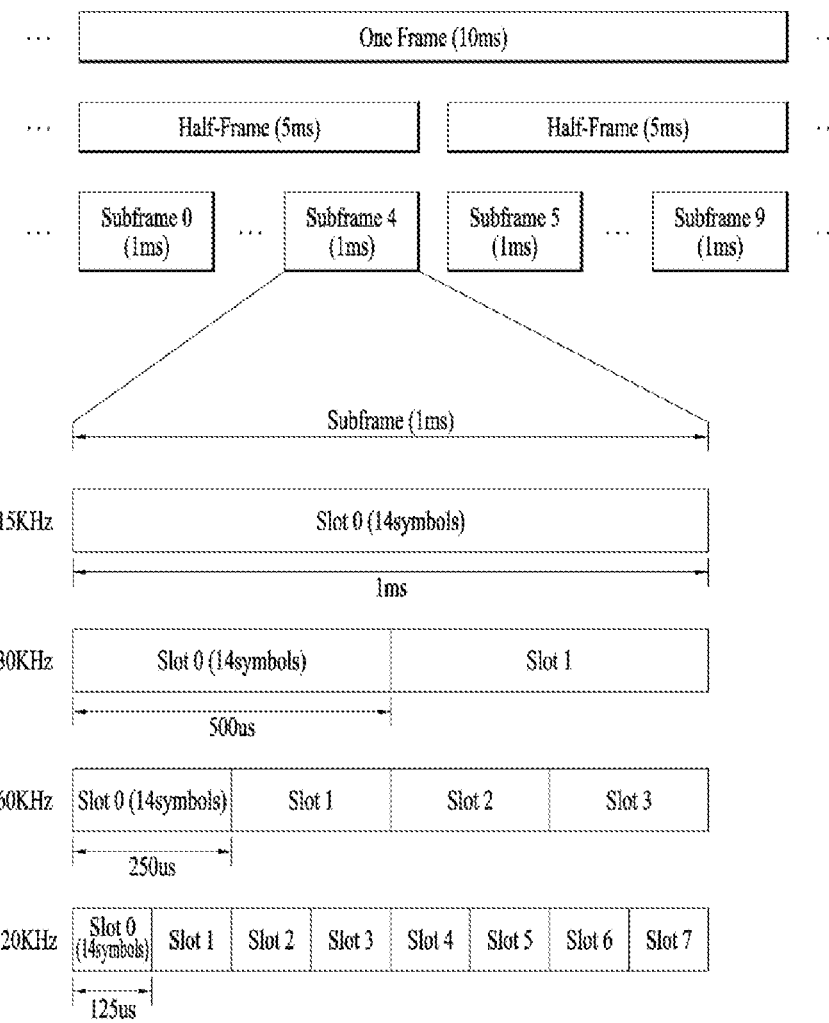
FIG. 6 illustrates the structure of a radio frame of NR to which embodiment(s) are applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration $\mu$ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
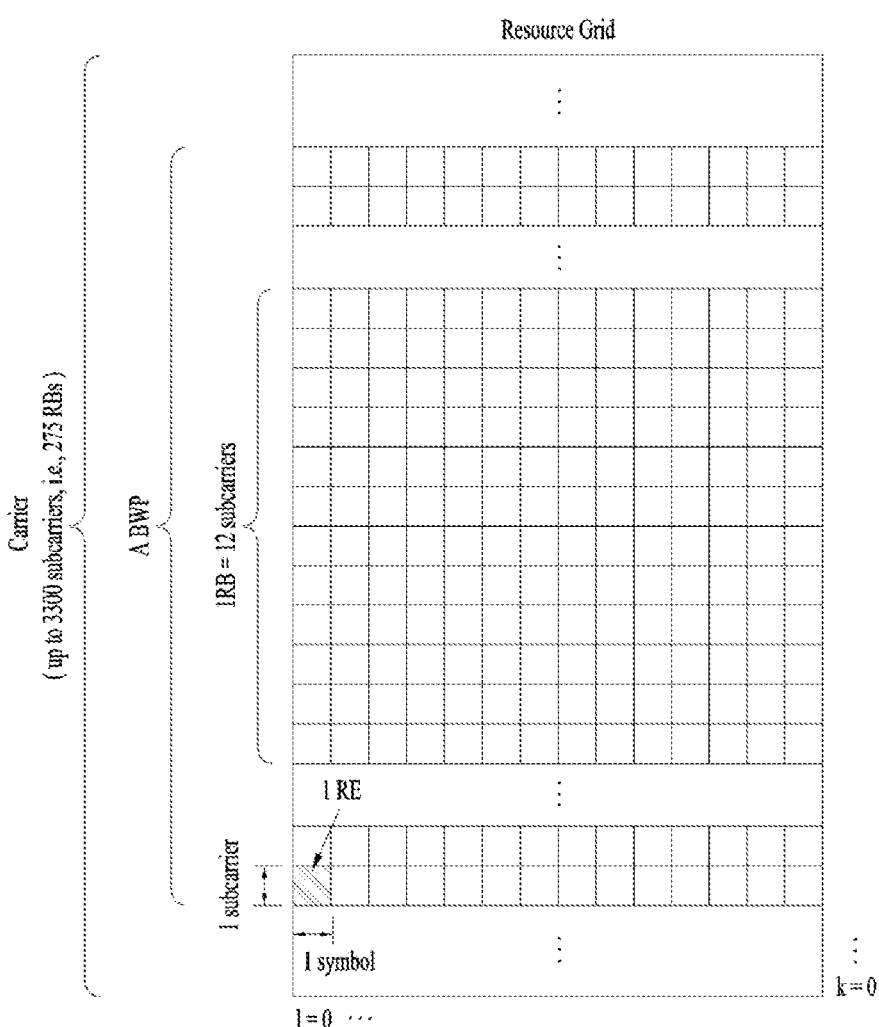
FIG. 7 illustrates the structure of a slot in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8A:
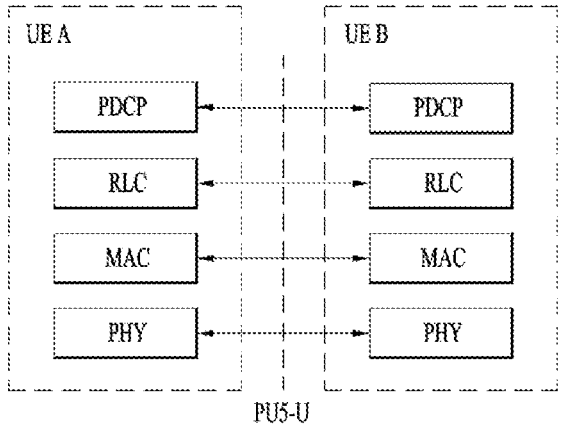
FIGS. 8A and 8B illustrate a radio protocol architecture for sidelink (SL) communication according to an embodiment of the present disclosure.
Figure 8B:
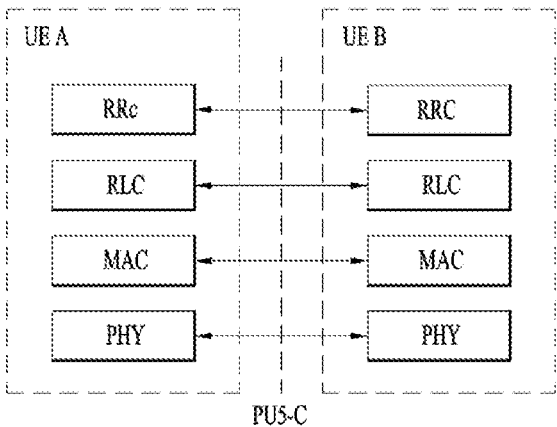

FIGS. 8A and 8B illustrate a radio protocol architecture for SL communication according to an embodiment of the present disclosure. Specifically, FIG. 8A illustrates a user-plane protocol stack in LTE, and FIG. 8B illustrates a control-plane protocol stack in LTE.

Figure 9A:
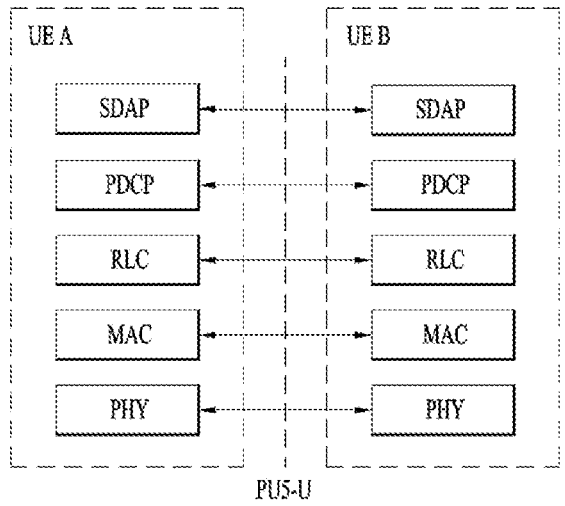
FIGS. 9A and 9B illustrate a radio protocol architecture for SL communication according to an embodiment of the present disclosure.
Figure 9B:
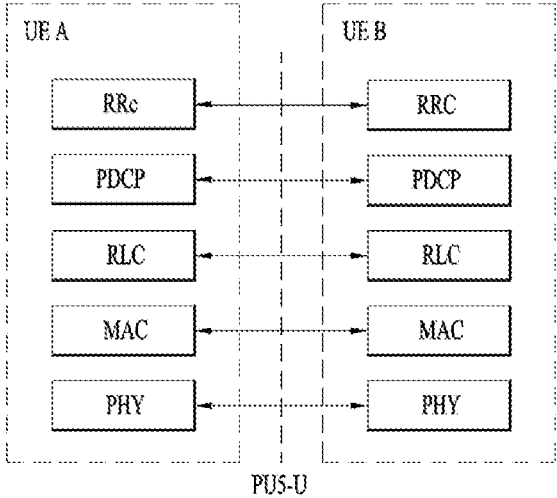

FIGS. 9A and 9B illustrate a radio protocol architecture for SL communication according to an embodiment of the present disclosure. Specifically, FIG. 9A illustrates a user-plane protocol stack in NR, and FIG. 9B illustrates a control-plane protocol stack in NR.

Figure 10:
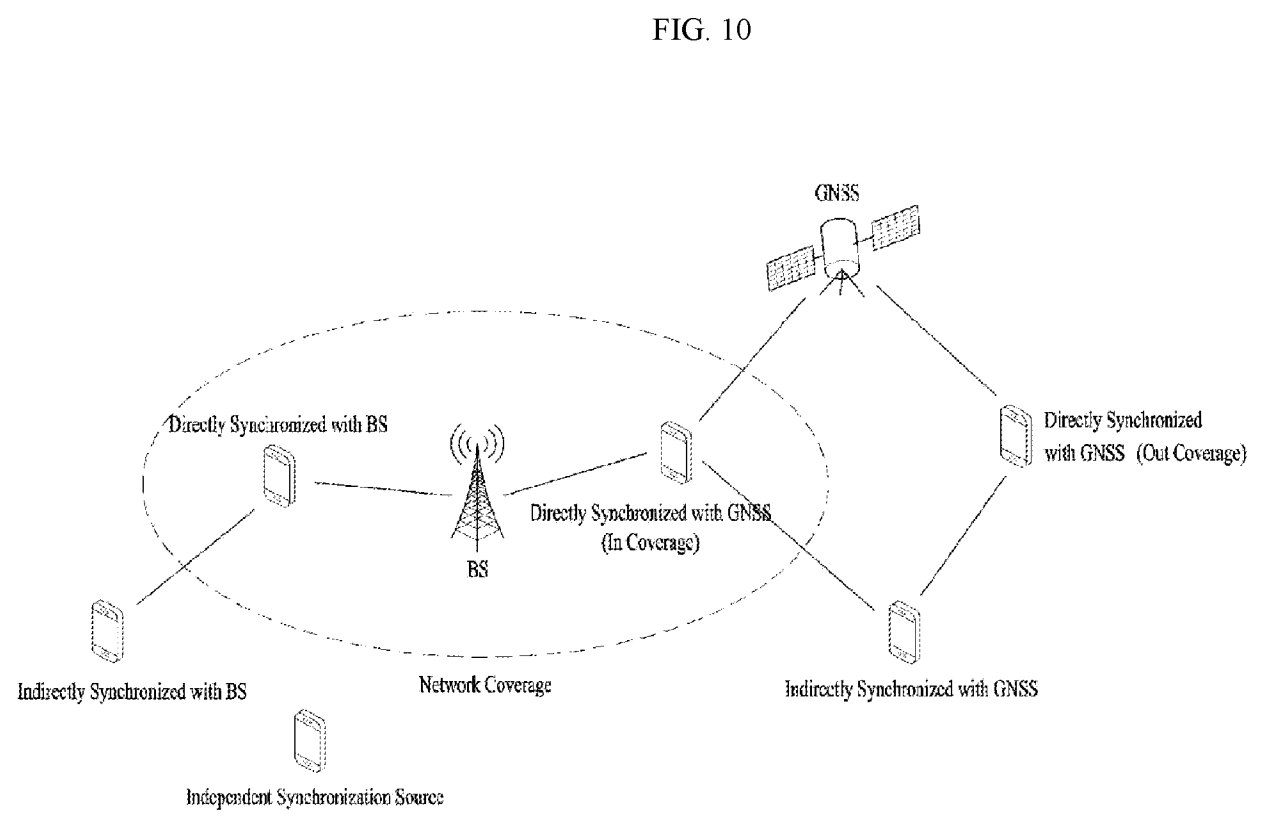

FIG. 10 illustrates a synchronization source or synchronization reference of V2X according to an embodiment of the present disclosure.

Referring to FIG. 10, in V2X, a UE may be directly synchronized with global navigation satellite systems (GNSS). Alternatively, the UE may be indirectly synchronized with the GNSS through another UE (within or out of network coverage). If the GNSS is configured as a synchronization source, the UE may calculate a direct frame number (DFN) and a subframe number based on a coordinated universal time (UTC) and a configured (or preconfigured) DFN offset.

Alternatively, a UE may be directly synchronized with a BS or may be synchronized with another UE that is synchronized in time/frequency with the BS. For example, the BS may be an eNB or a gNB. For example, when a UE is in network coverage, the UE may receive synchronization information provided by the BS and may be directly synchronized with the BS. Next, the UE may provide the synchronization information to another adjacent UE. If a timing of the BS is configured as a synchronization reference, the UE may follow a cell associated with a corresponding frequency (when the UE is in cell coverage in frequency) or a primary cell or a serving cell (when the UE is out of cell coverage in frequency), for synchronization and DL measurement.

The BS (e.g., serving cell) may provide a synchronization configuration for a carrier used for V2X/SL communication. In this case, the UE may conform to the synchronization configuration received from the BS. If the UE fails to detect any cell in the carrier used for V2X/SL communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference may be preconfigured for the UE. Alternatively, the synchronization source and the preference may be configured through a control message provided by the BS.

SL synchronization sources may be associated with synchronization priority levels. For example, a relationship between synchronization sources and synchronization priorities may be defined as shown in Table 14 or 15. Table 5 or 6 is merely an example, and the relationship between synchronization sources and synchronization priorities may be defined in various ways.

TABLE 5

| Priority level | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with GNSS |
| P3 | BS | GNSS |
| P4 | All UEs directly synchronized with GNSS | All UEs directly synchronized with GNSS |
| P5 | All UEs indirectly synchronized with GNSS | All UEs indirectly synchronized with GNSS |
| P6 | Remaining UE(s) with low priority | Remaining UE(s) with low priority |

In Table 5 or 6, P0 may mean the highest priority, and P6 may mean the lowest priority. In Table 5 or 6, the BS may include at least one of a gNB or an eNB.

Whether to use GNSS-based synchronization or eNB/gNB-based synchronization may be (pre)configured. In a single-carrier operation, the UE may derive a transmission timing thereof from an available synchronization reference having the highest priority.

Hereinafter, a sidelink synchronization signal (SLSS) and synchronization information will be described.

As an SL-specific sequence, the SLSS may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may use the S-PSS to detect an initial signal and obtain synchronization. In addition, the UE may use the S-PSS and the S-SSS to obtain detailed synchronization and detect a synchronization signal ID.

A physical sidelink broadcast channel (PSBCH) may be a (broadcast) channel for transmitting default (system) information that the UE needs to know first before transmitting and receiving SL signals. For example, the default information may include information related to an SLSS, a duplex mode (DM), a time division duplex (TDD) UL/DL configuration, information related to a resource pool, an application type related to the SLSS, a subframe offset, broadcast information, etc. For example, for evaluation of PSBCH performance in NR V2X, the payload size of the PSBCH may be 56 bits including a CRC of 24 bits.

The S-PSS, S-SSS, and PSBCH may be included in a block format (e.g., SL synchronization signal (SS)/PSBCH block) supporting periodical transmission (hereinafter, the SL SS/PSBCH block is referred to as a sidelink synchronization signal block (S-SSB)). The S-SSB may have the same numerology (i.e., SCS and CP length) as that of a physical sidelink control channel (PSCCH)/physical sidelink shared channel (PSSCH) on a carrier, and the transmission bandwidth may exist within a configured (or preconfigured) SL BWP. For example, the S-SSB may have a bandwidth of 11 RBs. For example, the PSBCH may span 11 RBs. In addition, the frequency position of the S-SSB may be configured (or preconfigured). Therefore, the UE does not need to perform hypothesis detection on frequency to discover the S-SSB on the carrier.

The NR SL system may support a plurality of numerologies with different SCSs and/or different CP lengths. In this case, as the SCS increases, the length of a time resource used by a transmitting UE to transmit the S-SSB may decrease. Accordingly, the coverage of the S-SSB may be reduced. Therefore, in order to guarantee the coverage of the S-SSB, the transmitting UE may transmit one or more S-SSBs to a receiving UE within one S-SSB transmission period based on the SCS. For example, the number of S-SSBs that the transmitting UE transmits to the receiving UE within one S-SSB transmission period may be pre-configured or configured for the transmitting UE. For example, the S-SSB transmission period may be 160 ms. For example, an S-SSB transmission period of 160 ms may be supported for all SCSs.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

Figure 11:
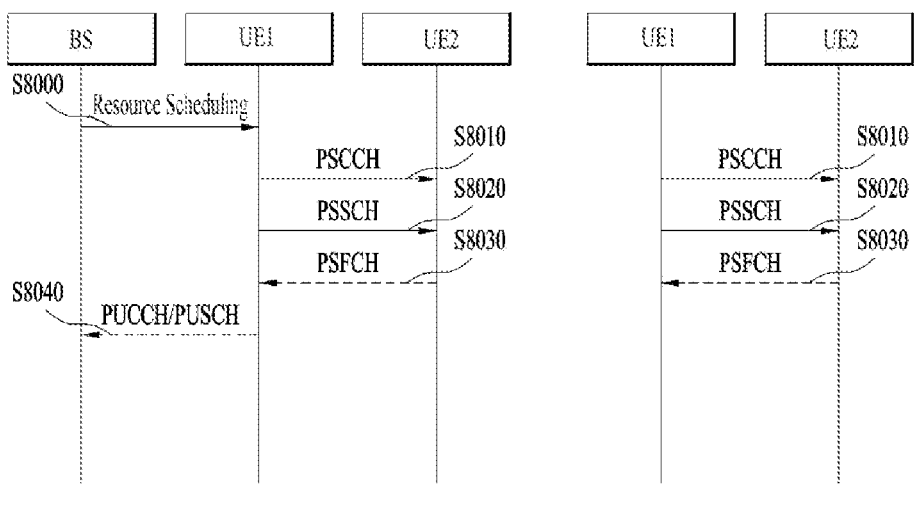
FIGS. 11A and 11B illustrate a procedure for a user equipment (UE) to perform V2X or SL communication depending on transmission modes according to an embodiment of the present disclosure.

FIGS. 11A and 11B illustrate a procedure of performing V2X or SL communication by a UE depending on a transmission mode according to an embodiment of the present disclosure. The embodiment of FIGS. 11A and 11B may be combined with various embodiments of the present disclosure. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 11A illustrates a UE operation related to LTE transmission mode 1 or LTE transmission mode 3. Alternatively, for example, FIG. 11A illustrates a UE operation related to NR resource allocation mode 1. For example, LTE transmission mode 1 may apply to general SL communication, and LTE transmission mode 3 may apply to V2X communication.

For example, FIG. 11B illustrates a UE operation related to LTE transmission mode 2 or LTE transmission mode 4. Alternatively, for example, FIG. 11B illustrates a UE operation related to NR resource allocation mode 2.

Referring to FIG. 11A, in LTE transmission mode 1, LTE transmission mode 3, or NR resource allocation mode 1, a BS may schedule an SL resource to be used for SL transmission by a UE. For example, in step S8000, the BS may transmit information related to an SL resource and/or information related to a UE resource to a first UE. For example, the UL resource may include a PUCCH resource and/or a PUSCH resource. For example, the UL resource may be a resource to report SL HARQ feedback to the BS.

For example, the first UE may receive information related to a Dynamic Grant (DG) resource and/or information related to a Configured Grant (CG) resource from the BS. For example, the CG resource may include a CG type 1 resource or a CG type 2 resource. In the present specification, the DG resource may be a resource configured/allocated by the BS to the first UE in Downlink Control Information (DCI). In the present specification, the CG resource may be a (periodic) resource configured/allocated by the BS to the first UE in DCI and/or an RRC message. For example, for the CG type 1 resource, the BS may transmit an RRC message including information related to the CG resource to the first UE. For example, for the CG type 2 resource, the BS may transmit an RRC message including information related to the CG resource to the first UE, and the BS may transmit DCI for activation or release of the CG resource to the first UE.

In step S8010, the first UE may transmit a PSCCH (e.g., Sidelink Control Information (SCI) or 1st-stage SCI) to a second UE based on the resource scheduling. In step S8020, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE. For example, HARQ feedback information (e.g., NACK information or ACK information) may be received from the second UE over the PSFCH. In step S8040, the first UE may transmit/report HARQ feedback information to the BS over a PUCCH or PUSCH. For example, the HARQ feedback information reported to the BS may include information generated by the first UE based on HARQ feedback information received from the second UE. For example, the HARQ feedback information reported to the BS may include information generated by the first UE based on a preset rule. For example, the DCI may be a DCI for scheduling of SL. For example, the format of the DCI may include DCI format 3_0 or DCI format 3_1. Table 7 shows one example of DCI for scheduling of SL.

TABLE 7

7.3.1.4.1   Format 3_0

DCI format 3_0 is used for scheduling of NR PSCCH and NR PSSCH in one cell. The following information is transmitted by means of the DCI format 3_0 with CRC scrambled by SL-RNTI or SL-CS-RNTI:

- Resource pool index -$\lceil \log_2 I \rceil$ bits, where I is the number of resource pools for transmission configured by the higher layer parameter sl-TxPoolScheduling.
- Time gap - 3 bits determined by higher layer parameter sl-DCI-ToSL-Trans, as defined in clause 8.1.2.1 of [6, TS 38.214]
- HARQ process number - 4 bits.
- New data indicator - 1 bit.
- Lowest index of the subchannel allocation to the initial transmission - $\lceil \log_2(N_{subChannel}^{SL}) \rceil$ bits as defined in clause 8.1.2.2 of [6, TS 38.214]
- SCI format 1-A fields according to clause 8.3.1.1:
-   Frequency resource assignment.
-   Time resource assignment.
- PSFCH-to-HARQ feedback timing indicator -$\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]
- PUCCH resource indicator - 3 bits as defined in clause 16.5 of [5, TS 38.213].
- Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.
- Counter sidelink assignment index - 2 bits
-   2 bits as defined in clause 16.5.2 of [5, TS 38.213] if the UE is configured with pdsch-HARQ-ACK-Codebook = dynamic
-   2 bits as defined in clause 16.5.1 of [5, TS 38.213] if the UE is configured with pdsch-HARQ-ACK-Codebook = semi-static
- Padding bits, if required If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.

If the UE is configured to monitor DCI format 3_1 and the number of information bits in DCI format 3_0 is less than the payload of DCI format 3_1, zeros shall be appended to DCI format 3_0 until the payload size equals that of DCI format 3_1.

7.3.1.4.2   Format 3_1

DCI format 3_1 is used for scheduling of LTE PSCCH and LTE PSSCH in one cell. The following information is transmitted by means of the DCI format 3_1 with CRC scrambled by SL Semi-Persistent Scheduling V-RNTI:

- Timing offset - 3 bits determined by higher layer parameter sl-TimeOffsetEUTRA-List, as defined in clause 16.6 of [5, TS 38.213]
- Carrier indicator -3 bits as defined in 5.3.3.1.9A of [11, TS 36.212].
- Lowest index of the subchannel allocation to the initial transmission - $\lceil \log_2(N_{subchannel}^{SL}) \rceil$ bits as defined in 5.3.3.1.9A of [11, TS 36.212].
- Frequency resource location of initial transmission and retransmission, as defined in 5.3.3.1.9A of [11, TS 36.212]
- Time gap between initial transmission and retransmission, as defined in 5.3.3.1.9A of [11, TS 36.212]
- SL index - 2 bits as defined in 5.3.3.1.9A of [11, TS 36.212]
- SL SPS configuration index - 3 bits as defined in clause 5.3.3.1.9A of [11, TS 36.212].
- Activation/release indication - 1 bit as defined in clause 5.3.3.1.9A of [11, TS 36.212].

Referring to FIG. 11B, in an LTE transmission mode 2, an LTE transmission mode 4, or an NR resource allocation mode 2, a UE may determine an SL transmission resource within an SL resource configured by a BS/network or a preconfigured SL resource. For example, the configured SL resource or the preconfigured SL resource may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in the step S8010, the first UE having self-selected a resource in the resource pool may transmit PSCCH (e.g., Side Link Control Information (SCI) or 1$^{st}$-stage SCI) to the second UE using the resource. In the step S8020, the first UE may transmit PSSCH (e.g., 2$^{nd}$-stage SCI, MAC PDU, data, etc.) related to the PSCCH to the second UE. In the step S8030, the first UE may receive PSFCH related to the PSCCH/PSSCH from the second UE.

Referring to FIG. 11A or FIG. 11B, for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as a Pt SCI, a 1$^{st}$-stage SCI, or a 1$^{st}$-stage SCI format, and the SCI transmitted on the PSSCH may be referred to as a 2nd SCI, a 2nd SCI, a 2nd-stage SCI format. For example, the 1$^{st}$-stage SCI format may include SCI format 1-A, and the 2$^{nd}$-stage SCI format may include SCI format 2-A and/or SCI format 2-B. Table 8 shows one example of a 1$^{st}$-stage SCI format.

TABLE 8

8.3.1.1 SCI format 1-A
SCI format 1-A is used for the scheduling of PSSCH and $2^{nd}$-stage-SCI on PSSCH
The following information is transmitted by means of the SCI format 1-A:
 - Priority - 3 bits as specified in clause 5.4.3.3 of [12, TS 23.287] and clause
 5.22.1.3.1 of [8, TS 38.321]. Value '000' of Priority field corresponds to priority value
 '1', value '001' of Priority field corresponds to priority value '2', and so on.

$$-\text{Frequency resource assignment} - \left\lceil \log_2\left(\frac{N^{SL}_{subChannel}\left(N^{SL}_{subChannel} + 1\right)}{2}\right) \right\rceil \text{ bits when the value}$$

of the higher layer parameter sl-MaxNumPerReserve is configured to 2; otherwise $$\left\lceil \log_2\left(\frac{N^{SL}_{subChannel}\left(N^{SL}_{subChannel} + 1\right)\left(2 N^{SL}_{subChannel} + 1\right)}{6}\right) \right\rceil \text{ bits when the value of the higher layer}$$

parameter sl-MaxNumPerReserve is configured to 3, as defined in clause 8.1.5 of [6,
TS 38.214].
- Time resource assignment - 5 bits when the value of the higher layer parameter sl-
MaxNumPerReserve is configured to 2; otherwise 9 bits when the value of the higher
layer parameter sl-MaxNumPerReserve is configured to 3, as defined in clause 8.1.5
of [6, TS 38.214].
- Resource reservation period - $\lceil \log_2 N_{rsv\_period} \rceil$ bits as defined in clause 16.4 of [5,
TS 38.213], where $N_{rsv\_period}$ is the number of entries in the higher layer parameter
sl-ResourceReservePeriodList, if higher layer parameter sl-MultiReserveResource is
configured; 0 bit otherwise.
- DMRS pattern - $\lceil \log_2 N_{pattern} \rceil$ bits as defined in clause 8.4.1.1.2 of [4, TS 38.211],
where $N_{pattern}$ is the number of DMRS patterns configured by higher layer parameter
sl-PSSCH-DMRS-TimePatternList.
- $2^{nd}$-stage SCI format - 2 bits as defined in Table 8.3.1.1-1.
- Beta_offset indicator - 2 bits as provided by higher layer parameter sl-
BetaOffsets2ndSCI and Table 8.3.1.1-2.
- Number of DMRS port - 1 bit as defined in Table 8.3.1.1-3.
- Modulation and coding scheme - 5 bits as defined in clause 8.1.3 of [6, TS 38.214].
- Additional MCS table indicator - as defined in clause 8.1.3.1 of [6, TS 38.214]: 1
bit if one MCS table is configured by higher layer parameter sl-Additional-MCS-
Table; 2 bits if two MCS tables are configured by higher layer parameter sl-
Additional-MCS-Table; 0 bit otherwise.
- PSFCH overhead indication - 1 bit as defined clause 8.1.3.2 of [6, TS 38.214] if
higher layer parameter sl-PSFCH-Period = 2 or 4; 0 bit otherwise.
- Reserved - a number of bits as determined by higher layer parameter sl-
NumReservedBits, with value set to zero.

Table 9 shows exemplary 2nd-stage SCI formats.

TABLE 9

8.4      Sidelink control information on PSSCH
SCI carried on PSSCH is a 2nd-stage SCI, which transports sidelink scheduling
information.
8.4.1      2nd-stage SCI formats
The fields defined in each of the $2^{nd}$-stage SCI formats below are mapped to the
information bits $a_0$ to $a_{A-1}$ as follows:
Each field is mapped in the order in which it appears in the description, with the first field
mapped to the lowest order information bit $a_0$ and each successive field mapped to higher
order information bits. The most significant bit of each field is mapped to the lowest order
information bit for that field, e.g. the most significant bit of the first field is mapped to $a_0$.
8.4.1.1 SCI format 2-A
SCI format 2-A is used for the decoding of PSSCH, with HARQ operation when HARQ-
ACK information includes ACK or NACK, when HARQ-ACK information includes only
NACK, or when there is no feedback of HARQ-ACK information.
The following information is transmitted by means of the SCI format 2-A:
 - HARQ process number - 4 bits.
 - New data indicator - 1 bit.
 - Redundancy version - 2 bits as defined in Table 7.3.1.1.1-2.
 - Source ID - 8 bits as defined in clause 8.1 of [6, TS 38.214].
 - Destination ID - 16 bits as defined in clause 8.1 of [6, TS 38.214].
 - HARQ feedback enabled/disabled indicator - 1 bit as defined in clause 16.3 of [5,
 TS 38.213].
 - Cast type indicator - 2 bits as defined in Table 8.4.1.1-1 and in clause 8.1 of [6, TS
 38.214].
 - CSI request - 1 bit as defined in clause 8.2.1 of [6, TS 38.214] and in clause 8.1 of
 [6, TS 38.214].

Referring to FIG. 11A or FIG. 11B, in step S8030, a first UE may receive a PSFCH based on Table 10. For example, the first UE and a second UE may determine a PSFCH resource based on Table 10, and the second UE may transmit HARQ feedback to the first UE on the PSFCH resource.

TABLE 10

16.3  UE procedure for reporting HARQ-ACK on sidelink
A UE can be indicated by an SCI format scheduling a PSSCH reception to transmit a PSFCH with HARQ-ACK information in response to the PSSCH reception. The UE provides HARQ-ACK information that includes ACK or NACK, or only NACK.
A UE can be provided, by sl-PSFCH-Period, a number of slots in a resource pool for a period of PSFCH transmission occasion resources. If the number is zero, PSFCH transmissions from the UE in the resource pool are disabled.
A UE expects that a slot $t_k'^{SL}$ ($0 \le k < T'_{max}$) has a PSFCH transmission occasion resource if k mod $N_{PSSCH}^{PSFCH} = 0$, where $t_k'^{SL}$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.
A UE is provided by sl-PSFCH-RB-Set a set of $M_{PRB,\ set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,\ slot}^{PSFCH}, (i + 1 + j \cdot N_{PSSCH}^{PSFCH}) \cdot M_{subch,\ slot}^{PSFCH} - 1]$ PRBs from the $M_{PRB,\ set}^{PSFCH}$ PRBs to slot i among the PSSCH slots associated with the PSFCH slot and sub-channel j, where $M_{subch,\ slot}^{PSFCH} = M_{PRB,\ set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,\ set}^{PSFCH}$ is a multiple of $N_{subch} \cdot N_{PSSCH}^{PSFCH}$.
The second OFDM symbol l' of PSFCH transmission in a slot is defined as l' = sl-StartSymbol + sl-LengthSymbols − 2 .
A UE determines a number of PSFCH resources available for multiplexing HARQ-ACK information in a PSFCH transmission as $R_{PRB,\ CS}^{PSFCH} = N_{type}^{PSFCH} \cdot M_{subch,\ slot}^{PSFCH} \cdot N_{CS}^{PRSFCH}$ where
$N_{CS}^{PSFCH}$ is a number of cyclic shift pairs for the resource pool provided by sl-NumMuxCS-Pair and, based on an indication by sl-PSFCH-CandidateResourceType,
  - if sl-PSFCH-CandidateResourceType is configured as startSubCH, $N_{type}^{PSFCH} = 1$ and the $M_{subch,\ slot}^{PSFCH}$ PRBs are associated with the starting sub-channel of the corresponding PSSCH;
  - if sl-PSFCH-CandidateResourceType is configured as allocSubCH, $N_{type}^{PSFCH} = N_{subch}^{PSSCH}$ and the $N_{subch}^{PSSCH} \cdot M_{subch,\ slot}^{PSFCH}$ PRBs are associated with the $N_{subch}^{PSSCH}$ sub-channels of the corresponding PSSCH.
The PSFCH resources are first indexed according to an ascending order of the PRB index, from the $N_{type}^{PSFCH} \cdot M_{subch,\ slot}^{PSFCH}$ PRBs, and then according to an ascending order of the cyclic shift pair index from the $N_{CS}^{PSFCH}$ cyclic shift pairs.
A UE determines an index of a PSFCH resource for a PSFCH transmission in response to a PSSCH reception as $(P_{ID} + M_{ID}) \bmod R_{PRB,\ CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
A UE determines a $m_0$ value, for computing a value of cyclic shift $\alpha$ [4, TS 38.211], from a cyclic shift pair index corresponding to a PSFCH resource index and from $N_{CS}^{PSFCH}$ using Table 16.3-1.

Referring to FIG. 11A, in step S8040, the first UE may transmit SL HARQ feedback to the BS over a PUCCH and/or PUSCH based on Table 11.

TABLE 11

16.5  UE procedure for reporting HARQ-ACK on uplink
A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.
For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.

TABLE 11-continued

For PSSCH transmissions scheduled by a DCI format 3_0, a UE generates HARQ-ACK
information in response to PSFCH receptions to multiplex in a PUCCH transmission
occasion that is after a last time resource in a set of time resources provided by the DCI
format 3_0.
From a number of PSFCH reception occasions, the UE generates HARQ-ACK
information to report in a PUCCH or PUSCH transmission. The UE can be indicated by a
SCI format to perform one of the following and the UE constructs a HARQ-ACK
codeword with HARQ-ACK information, when applicable
  - for one or more PSFCH reception occasions associated with SCI format 2-A with
  Cast type indicator field value of "10"
  -    generate HARQ-ACK information with same value as a value of HARQ-ACK
      information the UE determines from the last PSFCH reception from the number
      of PSFCH reception occasions corresponding to PSSCH transmissions or, if the
      UE determines that a PSFCH is not received at the last PSFCH reception
      occasion and ACK is not received in any of previous PSFCH reception
      occasions, generate NACK
  - for one or more PSFCH reception occasions associated with SCI format 2-A with
  Cast type indicator field value of "01"
  -    generate ACK if the UE determines ACK from at least one PSFCH reception
      occasion, from the number of PSFCH reception occasions corresponding to
      PSSCH transmissions, in PSFCH resources corresponding to every identity $M_{ID}$
      of the UEs that the UE expects to receive the PSSCH, as described in clause 16.3;
      otherwise, generate NACK
  - for one or more PSFCH reception occasions associated with SCI format 2-B or
  SCI format 2-A with Cast type indicator field value of "11"
  -    generate ACK when the UE determines absence of PSFCH reception for the last
      PSFCH reception occasion from the number of PSFCH reception occasions
      corresponding to PSSCH transmissions; otherwise, generate NACK
After a UE transmits PSSCHs and receives PSFCHs in corresponding PSFCH resource
occasions, the priority value of HARQ-ACK information is same as the priority value of
the PSSCH transmissions that is associated with the PSFCH reception occasions
providing the HARQ-ACK information.
The UE generates a NACK when, due to prioritization, as described in clause 16.2.4, the
UE does not receive PSFCH in any PSFCH reception occasion associated with a PSSCH
transmission in a resource provided by a DCI format 3_0 or, for a configured grant, in a
resource provided in a single period and for which the UE is provided a PUCCH resource
to report HARQ-ACK information. The priority value of the NACK is same as the
priority value of the PSSCH transmission.
The UE generates a NACK when, due to prioritization as described in clause 16.2.4, the
UE does not transmit a PSSCH in any of the resources provided by a DCI format 3_0 or,
for a configured grant, in any of the resources provided in a single period and for which
the UE is provided a PUCCH resource to report HARQ-ACK information. The priority
value of the NACK is same as the priority value of the PSSCH that was not transmitted
due to prioritization.
The UE generates an ACK if the UE does not transmit a PSCCH with a SCI format 1-A
scheduling a PSSCH in any of the resources provided by a configured grant in a single
period and for which the UE is provided a PUCCH resource to report HARQ-ACK
information. The priority value of the ACK is same as the largest priority value among the
possible priority values for the configured grant.

Table 12 below shows details of selection and reselection
of an SL relay UE defined in 3GPP TS 36.331. The contents
of Table 12 are used as the prior art of the present disclosure,
and related necessary details may be found in 3GPP TS
36.331.

TABLE 12

| 5.10.11.4 | Selection and reselection of sidelink relay UE |
|---|---|

A UE capable of sidelink remote UE operation that is configured by upper layers to search for a
sidelink relay UE shall:
    1>      if out of coverage on the frequency used for sidelink communication, as defined in TS
          36.304 [4], clause 11.4; or
    1>      if the serving frequency is used for sidelink communication and the RSRP
          measurement of the cell on which the UE camps (RRC_IDLE)/the PCell
          (RRC_CONNECTED) is below threshHigh within remoteUE-Config:
    2>    search for candidate sidelink relay UEs, in accordance with TS 36.133 [16]
    2>    when evaluating the one or more detected sidelink relay UEs, apply layer 3 filtering as
        specified in 5.5.3.2 across measurements that concern the same ProSe Relay UE ID and
        using the filterCoefficient in SystemInformationBlockType19 (in coverage) or the
        preconfigured filterCoefficient as defined in 9.3(out of coverage), before using the SD-
        RSRP measurement results;
  NOTE 1:        The details of the interaction with upper layers are up to UE implementation.
    2>    if the UE does not have a selected sidelink relay UE:
        3>    select a candidate sidelink relay UE which SD-RSRP exceeds q-RxLevMin included
            in either reselectionInfoIC (in coverage) or reselectionInfoOoC (out of coverage) by
            minHyst;

TABLE 12-continued

```
2>    else if SD-RSRP of the currently selected sidelink relay UE is below q-RxLevMin
      included in either reselectionInfoIC (in coverage) or reselectionInfoOoC (out of
      coverage); or if upper layers indicate not to use the currently selected sidelink relay:
      (i.e. sidelink relay UE reselection):
      3>    select a candidate sidelink relay UE which SD-RSRP exceeds q-RxLevMin included
            in either reselectionInfoIC (in coverage) or reselectionInfoOoC (out of coverage) by
            minHyst;
2>    else if the UE did not detect any candidate sidelink relay UE which SD-RSRP exceeds
      q-RxLevMin included in either reselectionInfoIC (in coverage) or reselectionInfoOoC
      (out of coverage) by minHyst:
      3>    consider no sidelink relay UE to be selected;
NOTE 2:            The UE may perform sidelink relay UE reselection in a manner resulting in
                  selection of the sidelink relay UE, amongst all candidate sidelink relay UEs meeting
                  higher layer criteria, that has the best radio link quality. Further details, including
                  interaction with upper layers, are up to UE implementation.
5.10.11.5                 Sidelink remote UE threshold conditions
A UE capable of sidelink remote UE operation shall:
1>    if the threshold conditions specified in this clause were not met:
2 >   if threshHigh is not included in remoteUE-Config within
      SystemInformationBlockType19; or
2>    if threshHigh is included in remoteUE-Config within SystemInformationBlockType19;
      and the RSRP measurement of the PCell, or the cell on which the UE camps, is below
      threshHigh by hystMax (also included within remoteUE-Config):
      3>    consider the threshold conditions to be met (entry);
1>    else:
2>    if threshHigh is included in remoteUE-Config within SystemInformationBlockType19;
      and the RSRP measurement of the PCell, or the cell on which the UE camps, is above
      threshHigh (also included within remoteUE-Config):
      3>    consider the threshold conditions not to be met (leave);
```

Sidelink (SL) Discontinuous Reception (DRX)

A MAC entity may be configured by an RRC as a DRX function of controlling a PDCCH monitoring activity of a UE for C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI, and SL Semi-Persistent Scheduling V-RNTI of the MAC entity. When using a DRX operation, a MAC entity should monitor PDCCH according to prescribed requirements. When DRX is configured in RRC_CONNECTED, a MAC entity may discontinuously monitor PDCCH for all activated serving cells.

RRC may control a DRX operation by configuring the following parameters.

drx-onDurationTimer: Duration time upon DRX cycle start drx-SlotOffset: Delay before drx-onDurationTimer start drx-InactivityTimer: Duration time after PDCCH that indicates new UL or DL transmission for a MAC entity drx-RetransmissionTimerDL (per DL HARQ process except for the broadcast process): Maximum duration time until DL retransmission is received drx-RetransmissionTimerUL (per UL HARQ process): Maximum time until a grant for retransmission is received drx-LongCycleStartOffset: Long DRX cycle and drx-StartOffset that define a subframe in which Long and Short DRX cycles start drx-ShortCycle (optional): Short DRX cycle drx-ShortCycleTimer (optional): Period for a UE to follow a short CRX cycle drx-HARQ-RTT-TimerDL (per DL HARQ process except for the broadcast process): Minimum duration time before DL allocation for HARQ retransmission is predicted by a MAC entity drx-HARQ-RTT-TimerUL (per UL HARQ process): Minimum duration time before a UL HARQ retransmission grant is predicted by a MAC entity drx-RetransmissionTimerSL (per HARQ process): Maximum period until a grant for SL retransmission is received drx-HARQ-RTT-TimerSL (per HARQ process): Minimum duration time before an SL retransmission grant is predicted by a MAC entity ps-Wakeup (optional): Configuration for starting drx-on DurationTimer connected when DCP is monitored but not detected ps-TransmitOtherPeriodicCSI (optional): Configuration to report a periodic CSI that is not L1-RSRP on PUCCH for a time duration period indicated by drx-onDurationTimer when connected drx-onDuration-Timer does not start despite that DCP is configured ps-TransmitPeriodicL1-RSRP (optional): Configuration to transmit a periodic CSI that is L1-RSRP on PUCCH for a time indicated by a drx-onDurationTimer when a connected drx-onDurationTimer does not start despite that DCP is configured.

A serving cell of a MAC entity may be configured by RRC in two DRX groups having separate DRX parameters. When the RRC does not configure a secondary DRX group, a single DRX group exists only and all serving cells belong to the single DRX group. When two DRX groups are configured, each serving cell is uniquely allocated to each of the two groups. DRX parameters separately configured for each DRX group include drx-onDurationTimer and drx-InactivityTimer. A DRX parameter common to a DRX group is as follows.

drx-onDurationTimer, drx-InactivityTimer.

DRX parameters common to a DRX group are as follows.

drx-SlotOffset, drx-RetransmissionTimerDL, drx-Retrans drx-SlotOffset, drx-RetransmissionTimerDL, drx-RetransmissionTimerUL, drx-LongCycleStartOffset, drx-Short-Cycle (optional), drx-ShortCycleTimer (optional), drx-HARQ-RTT-TimerDL, and drx-HARQ-RTT-TimerUL.

In addition, in a Uu DRX operation of the related art, drx-HARQ-RTT-TimerDL, drx-HARQ-RTT-TimerUL, drx-RetransmissionTimerDL, and drx-RetransmissionTimerUL are defined. When UE HARQ retransmission is performed, it is secured to make transition to a sleep mode during RTT timer (drx-HARQ-RTT-TimerDL, drx-HARQ-RTT-TimerUL) or to maintain an active state during Retransmission Timer (drx-RetransmissionTimerDL, drx-RetransmissionTimerUL).

In addition, for details of SL DRX, SL DRX-related contents of TS 38.321 and R2-2111419 may be referred to as the related art.

Tables 13 to 16 below show the details of sidelink DRX disclosed in 3GPP TS 38.321 V16.2.1, which are used as the prior art of the present disclosure.

TABLE 13

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].
   NOTE 1:  If Sidelink resource allocation mode 1 is configured by RRC, a DRX
          functionality is not configured.
RRC controls DRX operation by configuring the following parameters:
    - drx-onDurationTimer: the duration at the beginning of a DRX cycle;
    - drx-SlotOffset: the delay before starting the drx-onDurationTimer;
    - drx-InactivityTimer: the duration after the PDCCH occasion in which a PDCCH
    indicates a new UL or DL transmission for the MAC entity;
    - drx-RetransmissionTimerDL (per DL HARQ process except for the broadcast
    process): the maximum duration until a DL retransmission is received;
    - drx-RetransmissionTimerUL (per UL HARQ process): the maximum duration until
    a grant for UL retransmission is received;
    - drx-LongCycleStartOffset: the Long DRX cycle and drx-StartOffset which defines
    the subframe where the Long and Short DRX cycle starts;
    - drx-ShortCycle (optional): the Short DRX cycle;
    - drx-ShortCycleTimer (optional): the duration the UE shall follow the Short DRX
    cycle;
    - drx-HARQ-RTT-TimerDL (per DL HARQ process except for the broadcast
    process): the minimum duration before a DL assignment for HARQ retransmission is
    expected by the MAC entity;
    - drx-HARQ-RTT-TimerUL (per UL HARQ process): the minimum duration before a
    UL HARQ retransmission grant is expected by the MAC entity;
    - ps-Wakeup (optional): the configuration to start associated drx-onDurationTimer in
    case DCP is monitored but not detected;
    - ps-TransmitOtherPeriodicCSI (optional): the configuration to report periodic CSI
    that is not L1-RSRP on PUCCH during the time duration indicated by drx-
    onDurationTimer in case DCP is configured but associated drx-onDurationTimer is
    not started;
    - ps-TransmitPeriodicL1-RSRP (optional): the configuration to transmit periodic CSI
    that is L1-RSRP on PUCCH during the time duration indicated by drx-
    onDurationTimer in case DCP is configured but associated drx-onDurationTimer is
    not started.
Serving Cells of a MAC entity may be configured by RRC in two DRX groups with
separate DRX parameters. When RRC does not configure a secondary DRX group, there is
only one DRX group and all Serving Cells belong to that one DRX group. When two DRX
groups are configured, each Serving Cell is uniquely assigned to either of the two groups.
The DRX parameters that are separately configured for each DRX group are: drx-
onDurationTimer, drx-InactivityTimer. The DRX parameters that are common to the DRX
groups are: drx-SlotOffset, drx-RetransmissionTimerDL, drx-RetransmissionTimerUL, drx-
LongCycleStartOffset, drx-ShortCycle (optional), drx-ShortCycleTimer (optional), drx-
HARQ-RTT-TimerDL, and drx-HARQ-RTT-TimerUL.
When a DRX cycle is configured, the Active Time for Serving Cells in a DRX group
includes the time while:
    - drx-onDurationTimer or drx-InactivityTimer configured for the DRX group is
    running; or
    - drx-RetransmissionTimerDL or drx-RetransmissionTimerUL is running on any
    Serving Cell in the DRX group; or

TABLE 14

- ra-ContentionResolutionTimer (as described in clause 5.1.5) or msgB-ResponseWindow
(as described in clause 5.1.4a) is running; or
- a Scheduling Request is sent on PUCCH and is pending (as described in clause 5.4.4);   or
- a PDCCH indicating a new transmission addressed to the C-RNTI of the MAC entity has
not been received after successful reception of a Random Access Response for the
Random Access Preamble not selected by the MAC entity among the contention-based
Random Access Preamble (as described in clauses 5.1.4 and 5.1.4a).
When DRX is configured, the MAC entity shall:
   1>      if a MAC PDU is received in a configured downlink assignment:
   2>  start the drx-HARQ-RTT-TimerDL for the corresponding HARQ process in the first TABLE 14-continued symbol after the end of the corresponding transmission carrying the DL HARQ
feedback;
2> stop the drx-RetransmissionTimerDL for the corresponding HARQ process.
1>       if a MAC PDU is transmitted in a configured uplink grant and LBT failure
indication is not received from lower layers:
2> start the drx-HARQ-RTT-TimerUL for the corresponding HARQ process in the first
symbol after the end of the first repetition of the corresponding PUSCH transmission;
2> stop the drx-RetransmissionTimerUL for the corresponding HARQ process.
1>       if a drx-HARQ-RTT-TimerDL expires:
2> if the data of the corresponding HARQ process was not successfully decoded:
3> start the drx-RetransmissionTimerDL for the corresponding HARQ process in the
first symbol after the expiry of drx-HARQ-RTT-TimerDL.
1>       if a drx-HARQ-RTT-TimerUL expires:
2> start the drx-RetransmissionTimerUL for the corresponding HARQ process in the first
symbol after the expiry of drx-HARQ-RTT-TimerUL.
1>       if a DRX Command MAC CE or a Long DRX Command MAC CE is received:
2> stop drx-onDurationTimer for each DRX group;
2> stop drx-InactivityTimer for each DRX group.
1>       if drx-InactivityTimer for a DRX group expires:
2> if the Short DRX cycle is configured:
3> start or restart drx-ShortCycleTimer for this DRX group in the first symbol after the
expiry of drx-InactivityTimer;
3> use the Short DRX cycle for this DRX group.
2> else:
3> use the Long DRX cycle for this DRX group.
1>       if a DRX Command MAC CE is received:
2> if the Short DRX cycle is configured:
3> start or restart drx-ShortCycleTimer for each DRX group in the first symbol after the
end of DRX Command MAC CE reception;

TABLE 15

3> use the Short DRX cycle for each DRX group.
2> else:
3> use the Long DRX cycle for each DRX group.
1>       if drx-ShortCycleTimer for a DRX group expires:
2> use the Long DRX cycle for this DRX group.
1>       if a Long DRX Command MAC CE is received:
2> stop drx-ShortCycleTimer for each DRX group;
2> use the Long DRX cycle for each DRX group.
1>       if the Short DRX cycle is used for a DRX group, and [(SFN × 10) + subframe
number] modulo (drx-ShortCycle) = (drx-StartOffset) modulo (drx-ShortCycle):
2> start drx-onDurationTimer for this DRX group after drx-SlotOffset from the beginning
of the subframe.
1>       if the Long DRX cycle is used for a DRX group, and [(SFN × 10) + subframe
number] modulo (drx-LongCycle) = drx-StartOffset:
2> if DCP monitoring is configured for the active DL BWP as specified in TS 38.213 [6],
clause 10.3:
3> if DCP indication associated with the current DRX cycle received from lower layer
indicated to start drx-onDurationTimer, as specified in TS 38.213 [6]; or
3> if all DCP occasion(s) in time domain, as specified in TS 38.213 [6], associated with
the current DRX cycle occurred in Active Time considering
grants/assignments/DRX Command MAC CE/Long DRX Command MAC CE
received and Scheduling Request sent until 4 ms prior to start of the last DCP
occasion, or within BWP switching interruption length, or during a measurement
gap, or when the MAC entity monitors for a PDCCH transmission on the search
space indicated by recoverySearchSpaceId of the SpCell identified by the C-RNTI
while the ra-Response Window is running (as specified in clause 5.1.4); or
3> if ps-Wakeup is configured with value true and DCP indication associated with the
current DRX cycle has not been received from lower layers:
4> start drx-onDurationTimer after drx-SlotOffset from the beginning of the
subframe.
2> else:
3> start drx-onDurationTimer for this DRX group after drx-SlotOffset from the
beginning of the subframe.
NOTE 2:       In case of unaligned SFN across carriers in a cell group, the SFN of the SpCell is
used to calculate the DRX duration.
1>       if a DRX group is in Active Time:
2> monitor the PDCCH on the Serving Cells in this DRX group as specified in TS 38.213
[6];
2> if the PDCCH indicates a DL transmission:
3> start the drx-HARQ-RTT-TimerDL for the corresponding HARQ process in the first
symbol after the end of the corresponding transmission carrying the DL HARQ
feedback;
NOTE 3:       When HARQ feedback is postponed by PDSCH-to-HARQ_feedback timing
indicating a non-numerical k1 value, as specified in TS 38.213 [6], the
corresponding transmission opportunity to send the DL HARQ feedback is indicated TABLE 15-continued

| |
|---|
| in a later PDCCH requesting the HARQ-ACK feedback. |
| 3> stop the drx-RetransmissionTimerDL for the corresponding HARQ process. |
| 3> if the PDSCH-to-HARQ_feedback timing indicate a non-numerical k1 value as specified in TS 38.213 [6]: |
|     4> start the drx-RetransmissionTimerDL in the first symbol after the PDSCH transmission for the corresponding HARQ process. |
| 2> if the PDCCH indicates a UL transmission: |

TABLE 16

| |
|---|
| 3> start the drx-HARQ-RTT-TimerUL for the corresponding HARQ process in the first symbol after the end of the first repetition of the corresponding PUSCH transmission; |
| 3> stop the drx-RetransmissionTimerUL for the corresponding HARQ process. |
| 2> if the PDCCH indicates a new transmission (DL or UL) on a Serving Cell in this DRX group: |
|     3> start or restart drx-InactivityTimer for this DRX group in the first symbol after the end of the PDCCH reception. |
| 2> if a HARQ process receives downlink feedback information and acknowledgement is indicated: |
|     3> stop the drx-RetransmissionTimerUL for the corresponding HARQ process. |
| 1>     if DCP monitoring is configured for the active DL BWP as specified in TS 38.213 [6], clause 10.3; and |
| 1>     if the current symbol n occurs within drx-onDurationTimer duration; and |
| 1>     if drx-onDurationTimer associated with the current DRX cycle is not started as specified in this clause: |
| 2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause: |
|     3> not transmit periodic SRS and semi-persistent SRS defined in TS 38.214 [7]; |
|     3> not report semi-persistent CSI configured on PUSCH; |
|     3> if ps-TransmitPeriodicL1-RSRP is not configured with value true: |
|         4> not report periodic CSI that is L1-RSRP on PUCCH. |
|     3> if ps-TransmitOtherPeriodicCSI is not configured with value true: |
|         4> not report periodic CSI that is not L1-RSRP on PUCCH. |
| 1>     else: |
| 2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause: |
|     3> not transmit periodic SRS and semi-persistent SRS defined in TS 38.214 [7] in this DRX group; |
|     3> not report CSI on PUCCH and semi-persistent CSI configured on PUSCH in this DRX group. |
| 2> if CSI masking (csi-Mask) is setup by upper layers: |
|     3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and |
|         4> not report CSI on PUCCH in this DRX group. |
| NOTE 4:     If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s). |
| Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected. |
| The MAC entity needs not to monitor the PDCCH if it is not a complete PDCCH occasion (e.g. the Active Time starts or ends in the middle of a PDCCH occasion). |

A sidelink UE may transmit a SidelinkUEInformationNR message to a network. The purpose of the RRC message is to inform the network that the UE is interested or no longer interested in receiving NR sidelink communication, to request allocation or release of a transmission resource for NR sidelink communication, and to report a parameter related to the NR sidelink communication. The SidelinkUE-InformationNR includes sl-QoS-InfoList including a QoS profile of sidelink QoS flow and sl-DestinationIdentity indicating a destination to which SL failure is reported for unicast. In addition, UEAssistanceInformation refers to content disclosed in 3GPP TS 38.331.

The UEAssistanceInformation is for indicating UE assistance information to the network, and is transmitted from the UE to the network. The UEAssistanceInformation may include an sl-QoS-FlowIdentity element. The sl-QoS-Flow-Identity is an ID that uniquely identifies one sidelink QoS flow between the UE and the network within a UE scope, and has a unique value for different destinations and cast types. In addition, the UEAssistanceInformation refers to content disclosed in 3GPP TS 38.331.

Tables 17 and 18 below are related to a logical channel disclosed in 3GPP TS 38.321, and are used as prior art of the present disclosure.

TABLE 17

| |
|---|
| 5.22.1.4.1.2    Selection of logical channels |
| The MAC entity shall for each SCI corresponding to a new transmission: |
|    1>    select a Destination associated to one of unicast, groupcast and broadcast, having at least one of the MAC CE and the logical channel with the highest priority, among the logical channels that satisfy all the following conditions and MAC CE(s), if any, for the SL grant associated to the SCI: |
|    2>  SL data is available for transmission; and |
|    2>  SBj > 0, in case there is any logical channel having SBj > 0; and |
|    2>  sl-configuredGrantType1Allowed, if configured, is set to true in case the SL grant is a Configured Grant Type 1; and |
|    2>  sl-AllowedCG-List, if configured, includes the configured grant index associated to the SL grant; and |
|    2>  sl-HARQ-FeedbackEnabled is set to disabled, if PSFCH is not configured for the SL grant associated to the SCI. |
| NOTE 1:    If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation. |
|    1>    select the logical channels satisfying all the following conditions among the logical channels belonging to the selected Destination: |
|    2>  SL data is available for transmission; and |
|    2>  sl-configuredGrantType1Allowed, if configured, is set to true in case the SL grant is a Configured Grant Type 1; and. |
|    2>  sl-AllowedCG-List, if configured, includes the configured grant index associated to the SL grant; and |
|    2>  sl-HARQ-FeedbackEnabled is set to the value that satisfies the following conditions: |
|       3>  if PSFCH is configured for the sidelink grant associated to the SCI: |
|          4>  sl-HARQ-FeedbackEnabled is set to enabled, if sl-HARQ-FeedbackEnabled is set to enabled for the highest priority logical channel satisfying the above conditions; or |
|          4>  sl-HARQ-FeedbackEnabled is set to disabled, if sl-HARQ-FeedbackEnabled is set to disabled for the highest priority logical channel satisfying the above conditions. |
|       3>  else: |
|          4>  sl-HARQ-FeedbackEnabled is set to disabled. |
| NOTE 2:    HARQ feedback enabled/disabled indicator is set to disabled for the transmission of a MAC PDU only carrying CSI reporting MAC CE. |

TABLE 18

| |
|---|
| 5.22.1.4.1.3    Allocation of sidelink resources |
| The MAC entity shall for each SCI corresponding to a new transmission: |
|    1>    allocate resources to the logical channels as follows: |
|    2>    logical channels selected in clause 5.22.1.4.1.2 for the SL grant with SBj > 0 are allocated resources in a decreasing priority order. If the sPBR of a logical channel is set to infinity, the MAC entity shall allocate resources for all the data that is available for transmission on the logical channel before meeting the sPBR of the lower priority logical channel(s); |
|    2>    decrement SBj by the total size of MAC SDUs served to logical channel j above; |
|    2>    if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally. |
| NOTE: The value of SBj can be negative. |
| The UE shall also follow the rules below during the SL scheduling procedures above: |
|   - the UE should not segment an RLC SDU (or partially transmitted SDU or retransmitted RLC PDU) if the whole SDU (or partially transmitted SDU or retransmitted RLC PDU) fits into the remaining resources of the associated MAC entity; |
|   - if the UE segments an RLC SDU from the logical channel, it shall maximize the size of the segment to fill the grant of the associated MAC entity as much as possible; |
|   - the UE should maximise the transmission of data; |
|   - if the MAC entity is given a sidelink grant size that is equal to or larger than 12 bytes while having data available and allowed (according to clause 5.22.1.4.1) for transmission, the MAC entity shall not transmit only padding; |
|   - A logical channel configured with sl-HARQ-FeedbackEnabled set to enabled and a logical channel configured with sl-HARQ-FeedbackEnabled set to disabled cannot be multiplexed into the same MAC PDU. |

TABLE 18-continued

The MAC entity shall not generate a MAC PDU for the HARQ entity if the following conditions are satisfied:
    - there is no Sidelink CSI Reporting MAC CE generated for this PSSCH transmission as specified in clause 5.22.1.7; and
    - the MAC PDU includes zero MAC SDUs.
Logical channels shall be prioritised in accordance with the following order (highest priority listed first):
    - data from SCCH;
    - Sidelink CSI Reporting MAC CE;
    - data from any STCH.
5.22.1.4.2                               Multiplexing of MAC Control Elements and MAC SDUs
The MAC entity shall multiplex a MAC CE and MAC SDUs in a MAC PDU according to clauses 5.22.1.4.1 and 6.1.6.

Table 19 below shows an agreement in a 3GPP RAN2 [15] conference related to Groupcast (GC) and Broadcast (BC), and is used as prior art of the present disclosure.

TABLE 19

• WA: RAN2 assumes that the V2X layer of Rx UE passes the PC5 QoS parameters together with the corresponding destination layer-2 ID(s) for reception to the AS layer, as per TR 23.776 conclusion, and will further discuss SL DRX design based on this working assumption. RAN2 does not need to send LS to SA2 to clarify this issue.
• For GC/BC, DRX cycle should take at least QoS requirement into consideration.
• For GC/BC, DRX cycle(s) is configured per QoS profile. FFS on the need of down-select one DRX cycle from available DRX cycles for a specific L2 DST ID if UE has multiple QOS profiles for same DST L2 ID.
• For GC/BC, DRX cycle is configured per QoS profile.
• For GC/BC, RAN2 understands that sl-drx-startoffset does not take QoS requirement into consideration.
• For GC/BC, For GC/BC, sl-drx-startoffset is set based on DST L2 ID.
• For GC/BC, TX profile is introduced in Rel-17 for sidelink enhancement. FFS whether a TX profile identifies a Release, or one or more sidelink feature groups.
• For GC/BC, a Rel-17 TX UE shall only assume SL DRX for the RX UEs when the associated TX profile corresponding to support of SL DRX. FFS whether a TX profile needs to be provided with service type information or L2 id.
• For GC/BC only communication, a Rel-17 RX UE determines SL DRX is used if all service types/L2 ids of interest have an associated TX profile corresponding to support of SL DRX. A Rel-17 RX UE enables SL DRX operation for a service type/L2 id with the associated TX profile.
• For SL BC and GC, for in-coverage case, RRC_CONNECTED TX-UE/RX-UE can obtain DRX configuration from 1) SIB which is delivered via dedicated RRC signalling as in legacy, and from 2) from dedicated RRC signalling during handover, i.e., in an RRCReconfiguration message including reconfiguration WithSyn. Otherwise, RRC_CONNECTED TX-UE/RX-UE does not expect DRX configuration from dedicated RRC signalling.
• For BC/GC, the on-duration timer length and inactivity timer length (only for GC) are configured per QoS profile.
• For GC, do not pursue per-QoS or per-L2-ID configuration for RTT timer length and retransmission timer length.
• For BC/GC, default DRX configuration(s) can be used for QoS profile(s) which cannot be mapped into DRX configuration configured for the dedicated QoS profile(s).
• For BC/GC, do not pursue DRX command MAC CE in Rel-17.
• For GC, it's up to UE implementation to determine when the DRX configuration for SL GC communication is applied, i.e. no spec impact.
• For GC, when performing the down-selection of the inactivity timer, select the inactivity timer whose inactivity timer length is the largest one (among multiple ones for the corresponding L2 id) as the selected inactivity timer.
• Common default SL DRX configuration should be used for BC/GC.
• The default SL DRX configuration for BC/GC can be used for the DCR message. FFS for UC (at least for the initial message).
• Working assumption: Option2 (Need of down-selection for DRX cycle and on-duration) for GC/BC when multiple QoS profiles are associated with the same DST L2 ID.
• For GC, number of group members does not need to be considered in the determination of SL DRX on-duration and inactivity timers in the scenario where the UE knows it in Rel-17 (related to R2-2110938).

In a Groupcast (GC) operation for SL DRX, the same DST L2 ID may be derived for different services. In particular, this may occur when a Destination Layer-2 ID (hereinafter referred to as DST L2 ID) for GC is generated by the UE itself. When the same DST L2 ID is generated for different services, a TX profile value for each service may also be configured differently. In this case, a gNB may need to know which TX profile a TX UE uses for resource grant allocation or resource pool configuration. In addition, an RX UE receiving this also needs to know which TX profile the TX UE uses and a corresponding DRX configuration to receive a groupcast packet without loss.

Hereinafter, a method of operating a UE related to a case in which the same L2 DST ID is generated for different services during GC transmission and an apparatus related thereto will be described.

Figure 12:
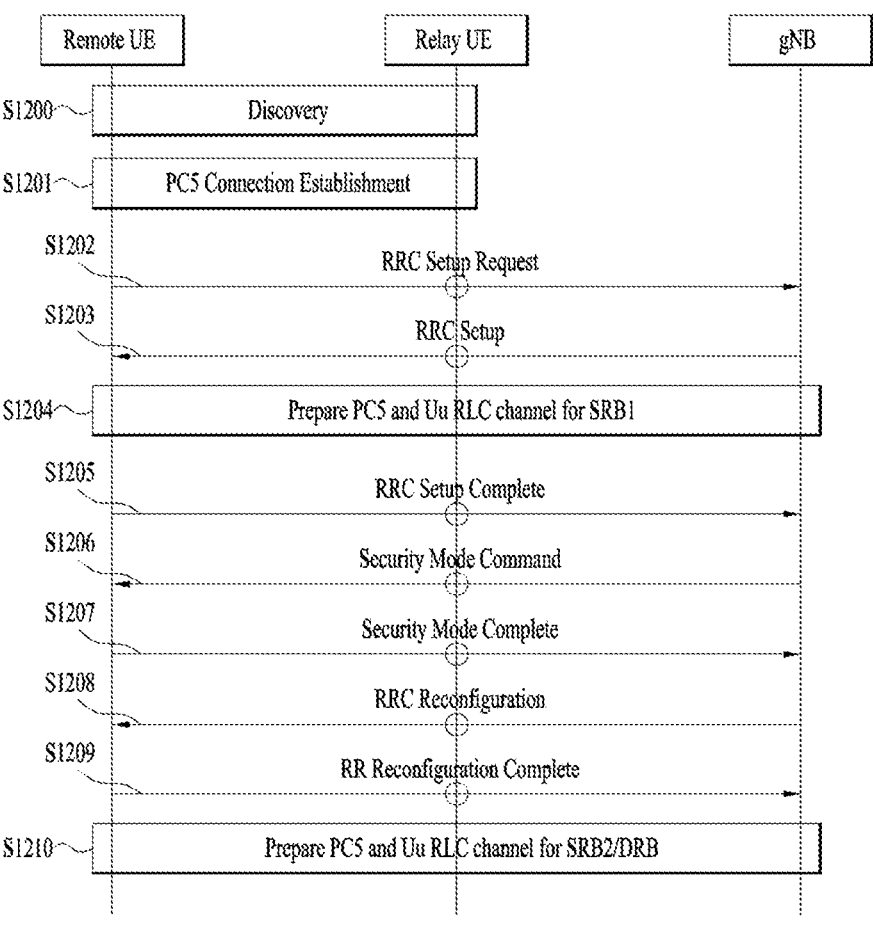
FIG. 12 illustrates a procedure for performing path switching by a UE according to an embodiment of the present disclosure.

For transmission related to group cast according to an embodiment, the UE may select a destination having a logical channel (LCH) with a highest priority among available sidelink data for transmission (S1201 in FIG. 12). A Medium Access Control Protocol Data Unit (MAC PDU) may be generated from data related to the destination (S1202) and the MAC PDU may be transmitted at an active time (S1203).

Here, the data related to the destination is data related to the active time among a plurality of data related to the destination, and the UE may determine data related to the active time among a plurality of data related to the destination based on a service ID (or group ID). The service ID (or group ID) may be transferred to an Access Stratum (AS) layer from a higher layer of the UE and the plurality of data related to the destination may be related to the same Destination Layer-2 ID (DST L2 ID). In addition, one TX profile may be related to the service ID (or group ID), and the TX profile may include configurations related to sidelink Discontinuous Reception (DRX). The configuration related to the sidelink DRX may include information indicating the active time.

In other words, the plurality of data related to the destination may be for one (same) DST L2 ID, and several service IDs (or group IDs) may be related to the destination. As described above, since one TX profile (including active time indication information) is related to the service ID (or group ID), a plurality of data with different active times may be related to the destination (DST L2 ID). In this case, conventionally, it was not possible to distinguish a plurality of data related to the same DST L2 ID but with different active times, but according to the present disclosure, the plurality of data may be distinguished through a service ID (or group ID), and thus a MAC PDU may be generated by correcting only data related to a specific active time.

That is, in a Logical Channel Prioritization (LCP) operation, data (/logical channel) with the highest priority (value) among available data for the logical channel may be selected, and then one MAC PDU may be generated by collecting data having the same L2 DST ID, cast type, and an indication (/service ID/group ID) as the corresponding data. Even if data have the same L2 DST ID, different DRX configurations may be applied and transmitted according to an indication (/service ID/group ID) related to the corresponding L2 DST ID.

Regarding the indication, a higher layer of the TX UE may transmit an indication indicating that the same DST L2 ID has been generated for different services together with the DST L2 ID (and/or TX profile) when transmitting a packet to the AS layer. At this time, the indication value may simply be a value indicating that the same DST L2 ID is generated for different services, but may be replaced with a service ID or group ID. That is, when a packet is transmitted from a higher layer to the AS layer, the service ID (and/or) group ID of the packet may be transmitted together. The AS layer receiving this may reflect it during LCP operation.

In summary, when the same L2 DST address is generated for different service IDs (and/or group IDs) and the TX profile applied to each service ID (and/or group ID) is changed to be DRX-enabled or DRX-disabled, the same MAC PDU may be generated for the same serving ID and the corresponding MAC PDU may be transmitted to a DRX active timer according to the TX profile of the corresponding service during an LCP operation of the AS layer using a serving ID(/group ID) during transmission of a packet to the AS layer, transmitted by the higher layer.

As such, when transmitting a packet from the higher layer to the AS layer, the service ID (/group ID) may be transmitted together, and the same MAC PDU may be generated for the same service ID during the LCP operation of the AS layer, and thus data with different TX profiles (active times) may be prevented from the multiplexed in one MAC PDU. Through this, data having the same DST L2 ID but different SL DRX configurations may be multiplexed and transmitted according to each SL DRX configuration. In addition, UEs having respective L2 IDs and DRX active times may receive all PDUs related to a specific service in the DRX active timer according to the TX profile of the service.

As another example, if the case in which a TX profile is DRX-enabled (or drx-Compatible) and the case in which the TX profile is DRX-disabled (or drx-Incompatible) are mapped to the same L2 ID, an operation may also be limited by applying and transmitting the corresponding DRX configuration according to the TX profile that is DRX-enabled. That is, if a plurality of service IDs are related with one DST L2 ID, and a DRX-enabled TX profile (active time) and a DRX-disabled TX profile (active time) are related with the plurality of service IDs, respectively, the TX profiles may be all treated as DRX-enabled TX profiles and data may be transmitted at the active time of the DRX-enabled TX profile.

Alternatively, since a MAC PDU is generated for each indication (/service ID/group ID) according to the LCP operation as described above, data may be transmitted in a period corresponding to the active time of each DRX profile according to a DRX profile of a group ID associated with each MAC PDU. For example, even if data have the same DST L2 ID, MAC PDUs related to the DRX-enabled TX profile may transmit data only during the active time of the corresponding SL DRX configuration, and MAC PDUs related to the DRX-disabled TX profile may transmit data at any time ('always on').

As another example, a higher layer of the RX UE may transmit a service ID (/group ID/indication) of a packet to be received to the AS layer together with an L2 ID to be received. Depending on QoS profile information of the packet to be received, it may be possible to determine which SL DRX configuration to apply for reception. However, if the data to be received has the same L2 ID but different service IDs (/group ID/indication) and/or TX profiles are transmitted in the higher layer, it may be necessary to determine which SL DRX configuration to apply for reception. For example, for the same receiving L2 ID, when a DRX-enabled TX profile is applied to one service and a DRX-disabled TX profile is applied to another service, the RX UE may receive data according to a DRX configuration corresponding to a group ID (service ID/indication) for the corresponding L2 ID. The RX UE receiving the DRX-enabled TX profile may receive data at an active time of the corresponding DRX configuration, and the RX UE receiving the DRX-disable TX profile may always wake up. RX UEs receiving two TX profiles (DRX-enabled TX profile and DRX-disable TX profile) for the same L2 ID may always receive data (always wake-up).

When the TX UE reports the TX profile along with the DST L2 ID to the gNB (using SUI/AUI), it may be necessary to inform which TX profile is applied. This may be for resource pool configuration and/or resource grant.

Alternatively, the UE may report only information on a DRX-based TX profile to a base station (BS), and the UE may receive resource information allocated by the BS based on information on the DRX-based TX profile. When the DRX-enabled TX profile and the DRX-disabled TX profile are assigned to the same DST L2 ID, the (TX) UE may report only information on the DRX-based TX profile (only the corresponding QoS profile) to the BS. In this case, the BS allocates resources to a location corresponding to the active time of the DRX configuration to be used by the TX UE, which may be inferred from this.

Alternatively, two different (for each group ID/service ID/indication) TX profile and QoS profile L2 DST ID may be reported to the BS. In this case, the TX UE may indicate a group ID (/service ID/indication) to the SR/BSR when requesting resource allocation.

Alternatively, the TX UE may report the group ID (/service ID/indication) to the gNB. For example, the DST L2 ID, cast type, and QoS profile for each group ID are transmitted to the gNB. At this time, it may separately indicate that two (/multiple) different group IDs are configured for the same L2 ID. This may be seen as playing a different role than the aforementioned indication.

Hereinafter, embodiments related to the case in which available DRX configurations are different when the same L2 DST address is generated for different serving IDs (and/or group IDs) and QoS profiles of respective serving IDs (and/or group IDs) are different will be described (Needless to say, even in this case, the LCP procedure in consideration with the aforementioned group ID(/service ID/indication) may be applied in the same way).

As an example, a TX UE (/RX UE) may apply a different DRX configuration according to a group ID. For example, when the same DST L2 ID is generated for different services, a group ID (/service ID/indication described above) may be transmitted together when a packet is transmitted from a higher layer to the AS layer. The TX UE may determine the SL DRX configuration according to a QoS profile according to each group ID (/service ID). For example, for the same DST L2 ID, different DRX configurations (e.g., on-duration, inactive time, DRC cycle, start offset, slot offset, etc.) may be applied and transmitted according to the group ID (/service ID).

As another example, when the TX UE reports a DST L2 ID, a TX profile, a cast type, etc. to a BS through SUI/AUI, etc., a QoS profile may be transmitted for each group ID (/service ID/indication). In this case, a gNB may consider that the TX UE uses a DRX configuration suitable for a QoS profile for each group ID (/service ID), and allocate an appropriate resource. To this end, the TX UE may transmit a group ID (/service ID/indication) in SR/BSR when requesting a resource. For example, the TX UE may report a DST L2 ID, a TX profile, a cast type, a QoS profile, etc. together with the group ID for each group ID (service ID).

Alternatively, the TX UE may indicate that different group IDs (/service IDs) are mapped to the same L2 ID, and indicate how many group IDs (/service IDs) have become one same L2 ID. Instead of reporting a Group ID directly, several group IDs may be indicated by simple numerical values (1, 2, 3, etc.) to report a DST L2 ID, a TX profile, a cast type, a QoS profile, etc. for each numerical value representing each group ID. This may reduce signaling overhead compared to using a group ID (/service ID) or the like.

When the RX UE derives several L2 IDs with the same group IDs(/service IDs) to be received by the RX UE, the RX UE may estimate a DRX configuration using a QoS profile corresponding to each group ID (/service ID) and receive desired data by applying each DRX configuration for each group ID(/service ID).

A UE related to the above description includes at least one processor; and at least one computer memory operatively connected to the at least one processor and configured to store instructions that, when executed, cause the at least one processor to perform operations, the operations including selecting a destination having a logical channel (LCH) with a highest priority among available sidelink data for transmission; generating a Medium Access Control Protocol Data Unit (MAC PDU) from data related to the destination; and transmitting the MAC PDU at an active time, wherein the data related to the destination is data related to the active time among a plurality of data related to the destination, and the UE determines the data related to the active time among the plurality of data related to the destination based on a service ID.

The UE may communicate with at least one of another UE, a UE related to an autonomous vehicle, a BS, or a network.

In addition, in a processor for performing operations for the UE, the operations include: selecting a destination having logical channel (LCH) with a highest priority among available sidelink data for transmission; generating a Medium Access Control Protocol Data Unit (MAC PDU) from data related to the destination; and transmitting the MAC PDU at an active time, wherein the data related to the destination is data related to the active time among a plurality of data related to the destination, and the UE determines the data related to the active time among the plurality of data related to the destination based on a service ID.

In addition, in a non-volatile computer readable storage medium storing at least one computer program including instructions that, when executed by at least one processor, cause the at least one processor to perform operations for a UE, the operations including: selecting a destination having a logical channel (LCH) with a highest priority among sidelink data available for transmission; generating a Medium Access Control Protocol Data Unit (MAC PDU) from data related to the destination; and transmitting the MAC PDU at an active time, wherein the data related to the destination is data related to the active time among a plurality of data related to the destination, and the UE determines the data related to the active time among the plurality of data related to the destination based on a service ID.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
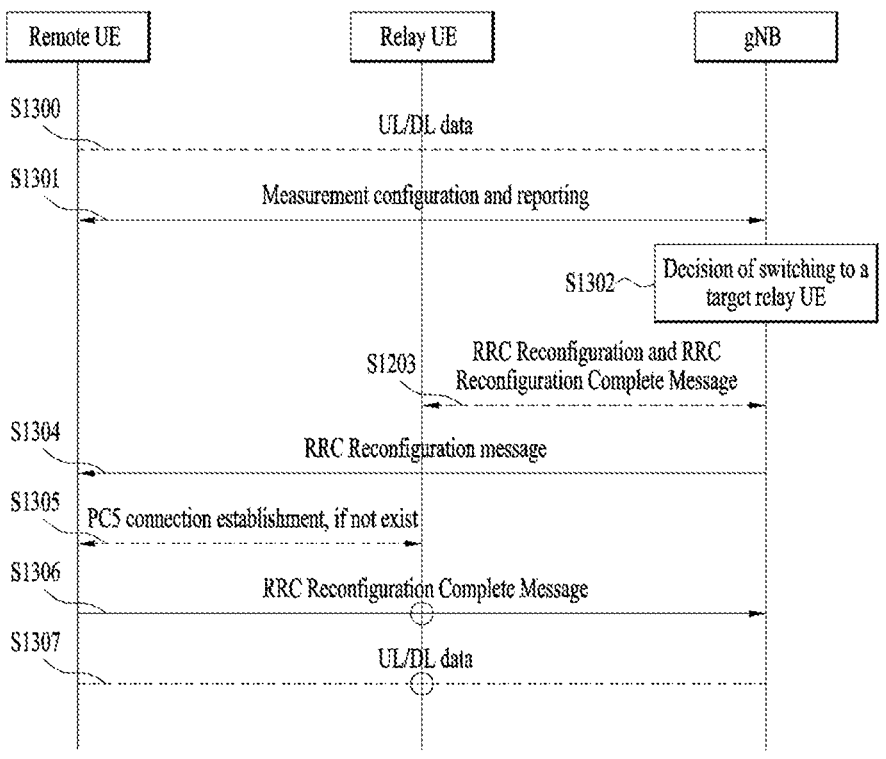
FIG. 13 is an example of switching from a direct to an indirect path.

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BS s/network. For example, the vehicles 100*b*-1 and 100*b*-2 may perform direct communication (e.g. V2V/V2X communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as UL/DL communication 150*a*, sidelink communication 150*b* (or, D2D communication), or inter BS communication (e.g. relay, integrated access backhaul (IAB)). The wireless devices and the BS s/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 14:
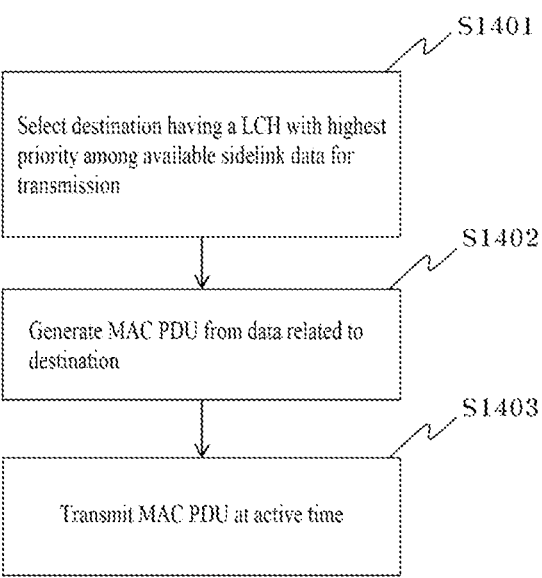
FIG. 14 is a diagram for explaining an embodiment.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
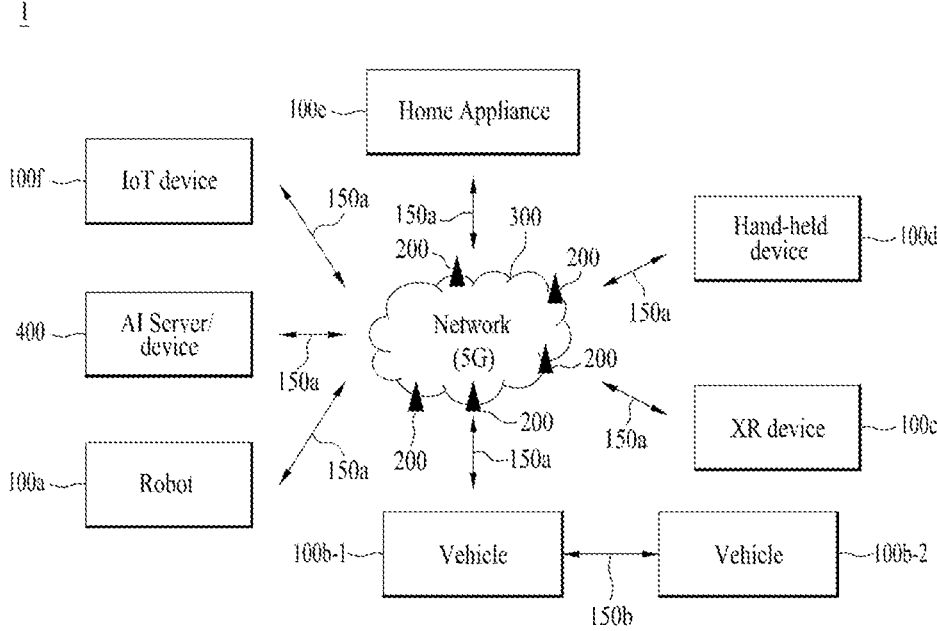
FIGS. 15 to 21 are diagrams for explaining various devices to which embodiment(s) are applicable.

Examples of a Vehicle or an Autonomous Driving Vehicle Applicable to the Present Disclosure FIG. 15 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 15, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/ wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 16:
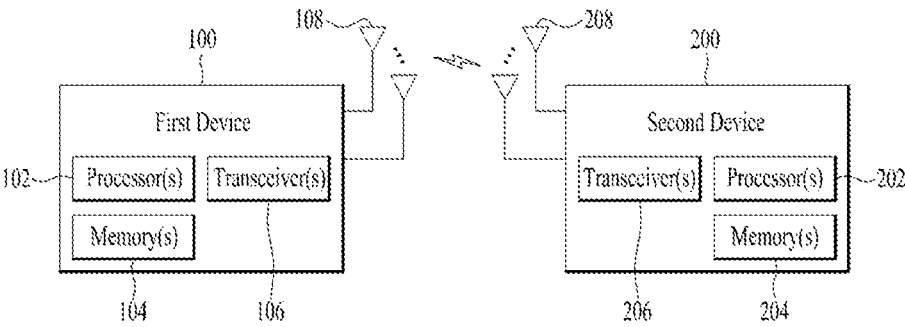

FIG. 16 illustrates a vehicle applied to the present disclosure. The vehicle may be implemented as a transport means, an aerial vehicle, a ship, etc.

Referring to FIG. 16, a vehicle 100 may include a communication unit 110, a control unit 120, a memory unit 130, an I/O unit 140*a*, and a positioning unit 140*b*.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR device applicable to the present disclosure

Figure 17:
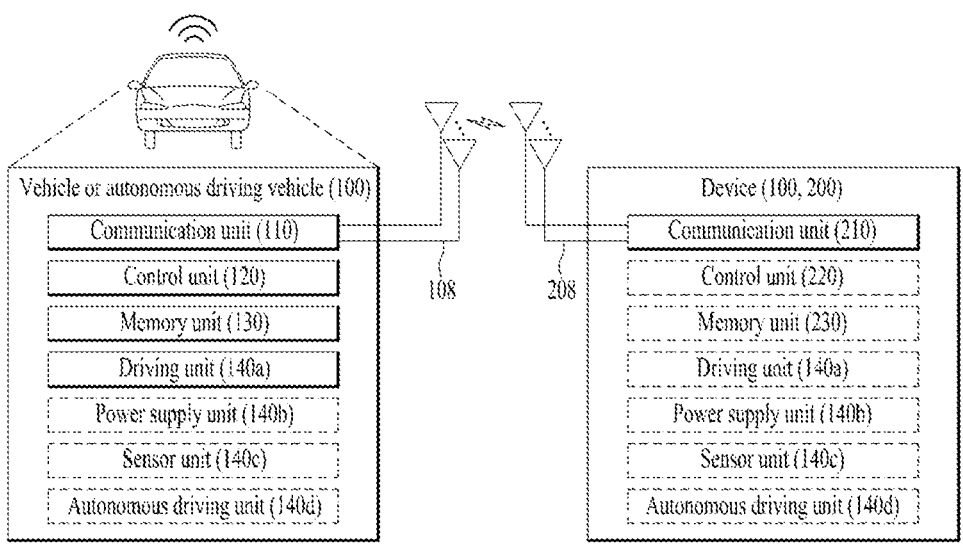

FIG. 17 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 17, an XR device 100*a* may include a communication unit 110, a control unit 120, a memory unit 130, an I/O unit 140*a*, a sensor unit 140*b*, and a power supply unit 140*c*.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 18:
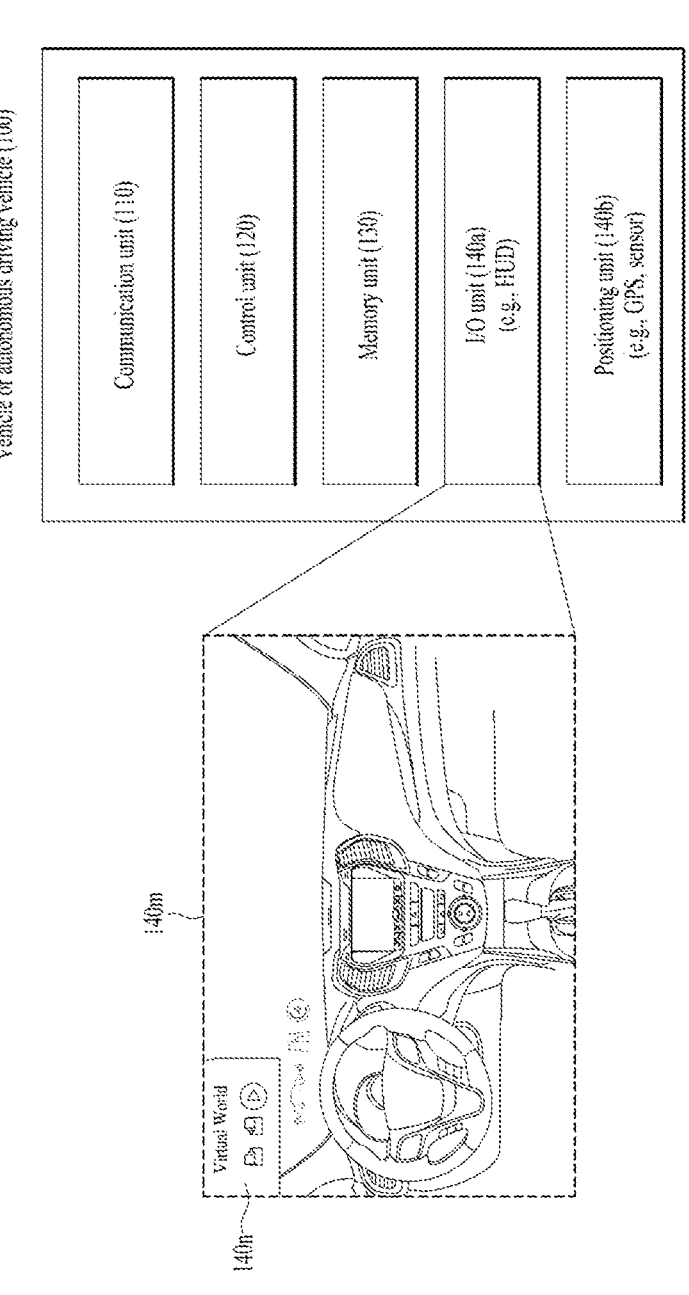

FIG. 18 illustrates a robot applied to the present disclosure. The robot may be categorized into an industrial robot, a medical robot, a household robot, a military robot, etc., according to a used purpose or field.

Referring to FIG. 18, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 14, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI Device to which the Present Disclosure is Applied

Figure 19:
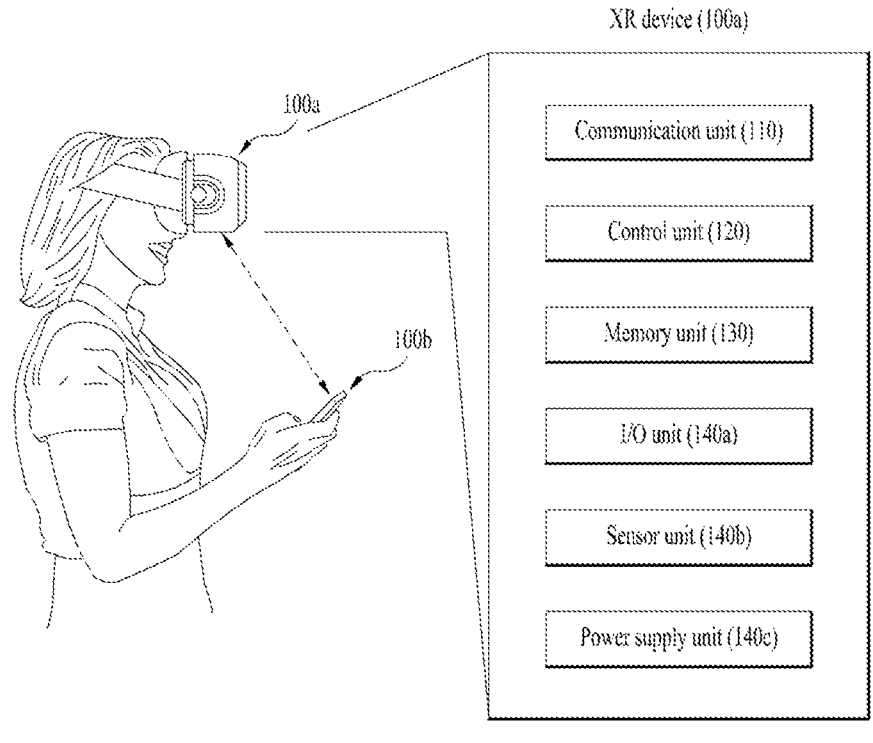
Figure 20:
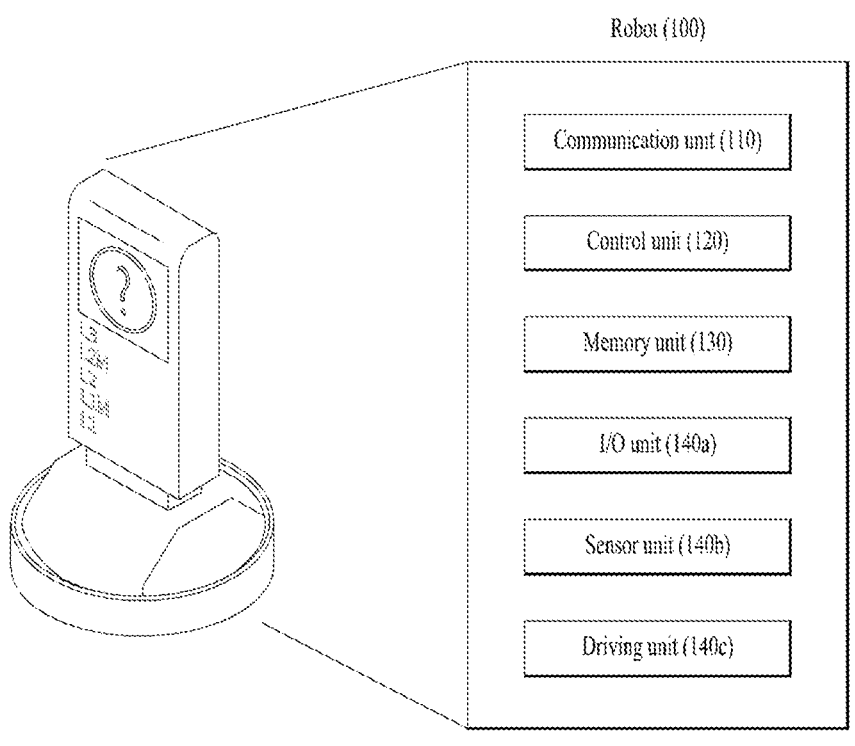
Figure 21:
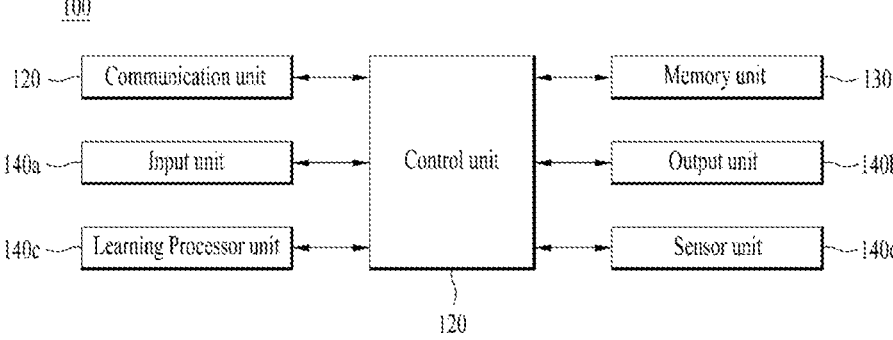

FIG. 19 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 19, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 14, respectively.

The communication unit 110 may transmit and receive wired/radio signals (e.g., sensor information, user input, learning models, or control signals) to and from external devices such as other AI devices (e.g., 100x, 200, or 400 of FIG. 13) or an AI server (e.g., 400 of FIG. 13) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 13). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 13). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The above-described embodiments of the present disclosure are applicable to various mobile communication systems.

According to an embodiment, data with the same DST L2 ID but different SL DRX configurations may be multiplexed and transmitted according to each SL DRX configuration.

What is claimed is:

1. A method comprising:
   prioritizing a logical channel (LCH) with a highest priority among available data for transmission;
   generating a Medium Access Control Protocol Data Unit (MAC PDU) from data; and
   transmitting the MAC PDU at an active time,
   wherein the data is data related to the active time among a plurality of data, and the UE determines the data related to the active time among the plurality of data based on a service ID,
   wherein the UE reports only information on a DRX-based TX profile to a base station (BS).

2. The method of claim 1, wherein the service ID is transferred to an Access Stratum (AS) layer.

3. The method of claim 1, wherein the plurality of data is related to the same Destination Layer-2 ID (DST L2 ID).

4. The method of claim 1, wherein one TX profile is related to the service ID and the method further comprising;

collecting data with same service ID as a service ID among a plurality of data, wherein each of the plurality of data are related to two or more service ID.

5. The method of claim 1, wherein the UE receives resource information that is allocated by the BS based on the information on the DRX-based TX profile.

6. A user equipment (UE) in a wireless communication system, comprising:
   at least one processor; and
   at least one computer memory operatively connected to the at least one processor and configured to store instructions that, when executed, cause the at least one processor to perform operations,
   wherein the operations include:
   prioritizing a destination having a logical channel (LCH) with a highest priority among available data for transmission;
   generating a Medium Access Control Protocol Data Unit (MAC PDU) from data; and
   transmitting the MAC PDU at an active time, and
   wherein the data is data related to the active time among a plurality of data, and the UE determines the data related to the active time among the plurality of data based on a service ID,
   wherein the UE reports only information on a DRX-based TX profile to a base station (BS).

7. The UE of claim 6, wherein the UE communicates with at least one of another UE, a UE related to an autonomous driving vehicle, a base station (BS), or a network.

8. A non-transitory computer readable storage medium storing at least one computer program including an instruction that, when executed by at least one processor, cause the at least one processor to perform operations for a user equipment (UE), the operations comprising:
   prioritizing a destination having a logical channel (LCH) with a highest priority among available data for transmission;
   generating a Medium Access Control Protocol Data Unit (MAC PDU) from data; and
   transmitting the MAC PDU at an active time,
   wherein the data is data related to the active time among a plurality of data, and the UE determines the data related to the active time among the plurality of data based on a service ID,
   wherein the UE reports only information on a DRX-based TX profile to a base station (BS).

* * * * *